United States Patent [19]
Cairns et al.

[11] 3,718,668
[45] Feb. 27, 1973

[54] BENZODIPYRONES

[75] Inventors: Hugh Cairns, Sandbach, Cheshire; Robert Minshull, Brereton, Cheshire, both of England

[73] Assignee: Fisons Limited, Suffolk, England

[22] Filed: Aug. 7, 1970

[21] Appl. No.: 62,170

Related U.S. Application Data

[63] Continuation-in-part of Ser. No. 751,753, Aug. 12, 1970, abandoned.

[52] U.S. Cl. ..........260/345.2, 260/345.5, 260/295 F, 260/326.3, 424/283
[51] Int. Cl. ................................................C07d 7/34
[58] Field of Search ..260/345.2, 345.5, 295 F, 326.3

[56] References Cited

UNITED STATES PATENTS 3,427,324  2/1969  Fitzmaurice........................260/345.2
3,484,445  12/1969  Lee et al............................260/345.2

*Primary Examiner*—John M. Ford
*Attorney*—Wenderoth, Lind & Ponack

[57] ABSTRACT

Certain benzodipyrones, e.g., 4,10-dioxo-2,8-dicarboxy-5-methoxy-4H,10H-benzo(1,2-b:3,4-b') dipyran disodium salt and many others which are disclosed, inhibit the release and/or action of toxic products which arise from the combination of certain types of antibody and specific antigen; and are useful in the treatment of conditions — such as asthma, hay fever, etc. — in which antigen reactions are responsible for said conditions.

28 Claims, No Drawings

BENZODIPYRONES

This is a continuation-in-part application of Applicants' copending application, Ser. No. 751,753, filed Aug. 12, 1970, now abandoned.

The present invention relates to novel compounds, their preparation and use.

According to the invention there are provided, as new compounds, benzodipyrones of the Formula I,

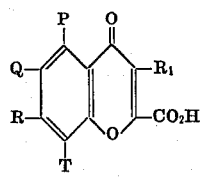

in which one or more adjacent pairs of P, Q, R and T, together form the chain $-CO-CR_1=C(CCOH)-O-$ which may be bonded to the benzene ring in either sense; the remainder of P, Q, R and T are the same or different and each is hydrogen; alkyl containing from one to 10 carbon atoms (e.g., methyl, ethyl, butyl, pentyl, and hexyl groups); alkyl containing from one to 10 carbon atoms and carrying a halo; hydroxy; lower alkoxy, e.g., methoxy, ethoxy, propoxy or pentoxy; acetoxy; carboxy; amino; lower alkylamino e.g., ethylamino, butylamino or pentylamino; lower di-alkylamino, e.g., dimethylamino, diethylamino, dibutylamino, dipentylamino; or a hydroxylamino substituent group;

unsaturated alkyl containing from one to 10 carbon atoms (e.g., alkenyl such as allyl and propargyl); phenylalkyl (e.g., benzyl and phenethyl groups), halophenylalkyl or alkylphenylalkyl wherein the alkyl groups contain from one to 10 carbon atoms; phenyl; naphthyl; or phenyl and naphthyl carrying a halo, lower alkyl, nitro, carboxy or hydroxy substituent group;

pyridyl; furyl; pyrrolyl; cycloalkyl containing from four to six carbon atoms (e.g., cyclopentyl or cyclohexyl); cycloalkyl containing from four to six carbon atoms and carrying a hydroxyl, lower alkoxy or carboxy substituent group nitrile; nitro; nitroso; hydroxy; alkoxy containing one to 10 carbon atoms e.g., methoxy, ethoxy or propoxy ; alkoxy containing from one to 10 carbon atoms and carrying a hydroxy, lower alkoxy, carboxy halo, amino, lower alkylamino, or lower dialkylamino substituent group;

alkenyloxy or alkynyloxy containing from one to 10 carbon atoms; benzyloxy; phenyloxy; naphthyloxy; pyridyloxy; cyclohexyloxy; cyclopentyloxy; epoxyloweralkoxy; amino; lower alkylamino e.g., ethylamino and propylamino ; lower dialkylamino e.g. dimethylamino and diethylamino ; cycloalkylamino containing from 4 to 6 carbon atoms; phenylamino; naphthylamino; diphenylamino; haloloweralkylamino; lower alkenylamino; aminoloweralkylamino, hydroxylamino; lower acyl amino; ureyl; thioureyl; guanidino; thiol; lower alkyl thiol; phenyl thiol; sulphonic acid; halogen e.g., chlorine, bromine, or iodine , or one or more of P, Q, R and T may be a group OY wherein Y is an alkyl group having from one to 10 carbon atoms substituted by lower alkyl or phenyl-lower alkyl in which one or more of the $CH_2$ groups has been replaced by oxygen, sulphur or carbonyl, which alkyl or phenyl-lower alkyl may carry one or more hydroxyl or carboxyl substituent groups; or an adjacent pair of P, Q, R and T (together with the adjacent carbon atoms in the benzene ring) together form a benzene ring, or a chain $-(CH_2)_4-$, $-(CH_2)_3-$, $-COCH=C(COOH)-O-$, $-O(CH_2)_3-$, $-O(CH_2)_2-$, $-C(CH_3)=CH-CO-O-$, $-O(CH_2)_2O-$, $-CH_2-CH(CH_3)-O-$, $-CH=CH-O-$, $-CH=C(CH_3)-O-$, $-OCH_2O-$, $-NH-C(R^4R^5)-CH_2-O-$, $-NR^5CH=CHO-$ or $-NR^4CH=CH-NR^4-$ (wherein $R^4$ is hydrogen or lower alkyl or lower alkoxy and $R^5$ is hydrogen, or $R^4$ and $R^5$ together form $a=O$ group), and each $R_1$ may be the same or different and is hydrogen, alkyl containing from one-10 carbon atoms, alkoxy containing from one-10 carbon atoms or phenyl and pharmaceutically acceptable derivatives thereof.

It will be appreciated that the chain $-CO-CR_1=C(COOH)-O-$ may be bonded to the benzene ring in either sense to form the rings

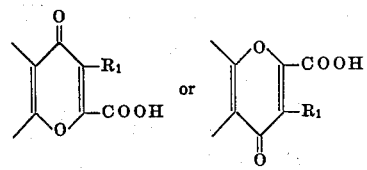

and reference to one chain or ring is intended herein and in the claims to denote bonding in both senses.

Preferred compounds of the invention include those wherein those of P, Q, R and T not forming a $-CO-CR_1=C(COOH)-O-$ chain are hydrogen or halogen, hydroxy, nitro, lower alkyl, lower alkenyl, benzyl, phenyl, lower alkoxy, lower alkenyloxy, phenyl, benzyloxy or the fused ring substituents specified above; and such groups carrying a halogen, hydroxy or lower alkoxy substituent. Particularly preferred compounds are those carrying hydrogen or a halogen (especially chlorine or bromine), nitro or lower alkyl or alkoxy group containing from one to six carbon atoms which may carry a hydroxy, lower alkoxy or phenyl substituent.

Also preferred are compounds of the formula:

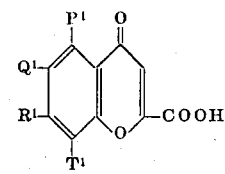

wherein an adjacent pair of $P^1$, $Q^1$, $R^1$ and $T^1$ together forms the chain $-CO-CH=C(COOH)-O-$ may be bonded to the benzene ring in either sense; and the other two $P^1$, $Q^1$, $R^1$ and $T^1$ may be the same or different and each is hydrogen, halogen, nitro, lower alkyl, lower alkoxy, or a lower alkyl or alkoxy group carrying a hydroxy, lower alkoxy or phenyl substituent.

As a further feature of our invention we provide compounds of Formula I in which those of P, Q, R and T which do not form a chain —COCR$_1$=C(COOH)—O— selected from the group consisting of hydrogen, hydroxy, nitro, halogen, lower alkyl, lower alkoxy or lower alkenyloxy groups (which groups may carry a hydroxy or lower alkoxy substituent), a benzyl group or an adjacent pair of P, Q, R and T may, together with the carbon atoms on the benzene ring form a fused oxygen containing 5 membered ring, and each $R_1$ is selected from the group consisting of hydrogen, alkyl containing from one to 10 carbon atoms, alkoxy containing from one to 10 carbon atoms and phenyl.

As a yet further feature of our invention we provide compounds of formula I in which $R_1$ is hydrogen and those of P, Q, R and T which do not form a —COCR$_1$=C(COOH)—O— chain are selected from methoxy, hydroxy, nitro, methyl, bromo, benzyloxy, ethyl, chloro, allyloxy, butyl, propyl and pentyl.

It will be appreciated that certain of the above values of the P, Q, R, T, $P^1$, $Q^1$, $R^1$ and $T^1$ include groups which might be detrimentally affected by the reactants and/or reaction conditions used to introduce other groups or the desired

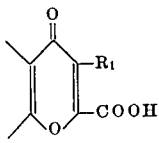

rings into the molecule. In such cases the affected group or site may be blocked or shielded, for example by alkylation, acetylation or by the blocking of the reactive site with a removable group such as a cyano or nitro group.

Each $R_1$ may be the same or different and have the values specified above, particularly hydrogen, lower alkyl, e.g., methyl, ethyl, propyl, or pentyl; lower alkoxy corresponding to such alkyl groups; or a phenyl group. It is usually preferred that each $R_1$ group be the same, and further, that each is hydrogen.

Pharmaceutically acceptable derivatives of the compound according to the invention include pharmaceutically acceptable salts, notably water-soluble salts, esters and amides of one or more of the carboxylic acid functions present and esters of any hydroxylic functions present.

Salts of the compounds which may be mentioned are salts with physiologically acceptable cations, for example, ammonium salts; metal salts, such as alkali metal salts (e.g., sodium, potassium and lithium salts) and alkaline earth metal salts (e.g., magnesium and calcium salts); and salts with organic bases, e.g., amine salts such as piperidine, triethanolamine and diethylaminoethylamine salts.

Esters which may be mentioned include simple alkyl esters derived from alcohols containing up to 10 carbon atoms; amides which may be mentioned include simple amides and more complex amides with amino acids such as glycine.

The pharmaceutically acceptable derivatives of the compounds of the invention may be prepared by conventional techniques. Thus, salts may be prepared by the use of alkaline conditions during the recovery and purification of the compound. Alternatively, the free acid may be obtained and subsequently converted to a desired salt by neutralization with an appropriate base, e.g., an organic amine, or alkali such as an alkali metal (e.g., sodium or potassium) or alkaline earth metal (e.g., calcium or magnesium) hydroxide, carbonate or bicarbonate, preferably a mild base or alkali such as sodium carbonate or bicarbonate. Where the compound is recovered in the form of a salt this salt may be converted to a more desirable salt, for example by a metathetical process. The esters may be obtained as a result of having used appropriate starting materials, for example by the reaction of a dialkyl oxalate with an acylbenzene of Formula V as hereinafter described; or may be formed by the reaction of an appropriate alcohol, alkyl sulphate or halo-compound with free carboxyl groups in the compound. Alternatively transesterification techniques may be used to exchange one ester group for another. The amides may be readily obtained, for example, by dehydration of the ammonium salt or by reaction of the carboxy ester groups in the compound with an appropriate amino compound such as a primary or secondary amine or an amino acid.

The new compounds of the invention have been shown to inhibit the release and/or action of toxic products which arise from the combination of certain types of antibody and specific antigen, e.g., the combination of reaginic antibody with specific antigen. In man, it has been found that both subjective and objective changes which result from the inhalation of specific antigen by sensitized subjects are markedly inhibited by prior administration of the new compounds. Thus, the new compounds are of great value in the treatment of "extrinsic" allergic asthma. It has also been found that the new compounds are of value in the treatment of so-called "intrinsic" asthma (in which no sensitivity to extrinsic antigen can be demonstrated). In in vitro tests, the compounds have been shown to reduce the release of pharmacologically active substances from passively sensitized human lung tissue after exposure to specific antigen using a modification of the in vitro technique or Mongar and Schild (J.L. Mongar and H.O. Schild, J. Physiol, Vol. 150 (1960), pp. 546–564). The new compounds may also be of value in the treatment of other conditions in which antigen reactions are responsible for disease, for example, hay fever, urticaria and auto-immune diseases.

According to a further feature of the invention, therefore, there is provided a pharmaceutical composition comprising a compound of general Formula I, or a pharmaceutically acceptable derivative thereof, preferably in the form of a salt, in association with a pharmaceutically acceptable carrier or diluent. There is also provided a process for the manufacture of such a pharmaceutical composition which comprises mixing a compound of the invention with a carrier or diluent.

The nature of the composition and the pharmaceutically acceptable carrier or diluent will, of course, depend upon the desired mode of administration, which may be for example oesophagally; by inhalation; parenterally; or by topical application.

The compositions may be formulated in the conventional manner with the customary ingredients. For example, the compositions may be put up as aqueous solutions or suspensions, as powders or in tablet, cream, lotion or syrup form.

The compounds of the invention find especial use when inhaled by the user, notably in the treatment of allergic asthma. For such use, the compounds of the invention, preferably in the form of a salt such as the sodium salt, are dissolved or suspended in water and may be applied by means of a conventional nebulizer. However, the administration of medicaments by means of a pressurized dispensing container, i.e., an aerosol dispenser, is an alternative to nebulizer administration. For administration from an aerosol dispenser, the medicament is dissolved or suspended in the liquefied propellant medium. Where the medicament is not soluble in the propellant, it may be necessary to add a surface-active agent to the composition in order to suspend the medicament in the propellant medium, and such surface-active agents may be any of those commonly used for this purpose, such as non-ionic surface-active agents. However, we prefer to use the anionic dialkyl sulphosuccinate or alkyl benzene sulphonate surface-active agents. The use of such surface-active agents and the advantages which stem therefrom are more fully described in British Pat. Specification No. 1,063,512.

The compositions of the invention may also be administered in the form of powders by means of an insufflator device, such as that described in our French Pat. Specification 1,471,722. In order to improve the properties of the powder, it may be desired to modify the surface characteristics of the powder particles, for example by coating them with a pharmaceutically acceptable material such as sodium stearate. In addition, the fine particle sized powders may be mixed with a coarser diluent material such as lactose.

While the inhalation of medicament has been described above with particular reference to oral administration, it will be appreciated that it may be desirable to administer the medicament nasally. The term inhalation is therefore used herein and in the claims to denote, where the context permits, both oral and nasal administration.

The composition of the invention may also be administered as tablets, syrups and the like or by intradermal or intravenous injection in the conventional manner.

In addition to the internal administration, the compounds of the invention may find use in compositions for topical application, e.g., as creams, lotions or pastes for use in dermatological treatments.

In addition to the compound of the invention and the ingredients required to present the compound in a form suitable for the selected mode of administration, we have found that other active ingredients may be present in the composition of the invention. Thus, in compositions for administration by inhalation, we have found that it is beneficial to include a bronchodilator. Any bronchodilator may, within reason, be used. Suitable bronchodilators include isoprenaline, adrenaline, orciprenaline, isoetharine and derivatives thereof, particularly the salts thereof. The use of isoprenaline sulphate is preferred. The amount of bronchodilator used will vary over a broad range, depending, inter alia, upon the nature and activity of the bronchodilator and the compound of the invention used. HOwever, the use a minor proportion (i.e., less than 50 percent by weight) of the bronchodilator is preferred. We have found that the use of from 0.1 to 10 percent by weight of the bronchodilator based on the weight of the compound of the invention is satisfactory.

From a further aspect, the invention therefore provides a composition which comprises a compound of the formula I or a pharmaceutically acceptable derivative thereof in admixture with a bronchodilator, which latter is preferably present in less than 50 percent, especially 0.1 to 10 percent, by weight of the former.

As indicated above, the compounds of the invention may be used to inhibit the effects of antibody-antigen reactions and are of especial use in the prophylactic treatment of allergic airway diseases. In such treatments the compound or composition of the invention is administered by the chosen method to the site of the antibody-antigen reaction in the therapeutically effective amount. The treatment may be one which requires repeated dosages of the medicament at regular intervals. The amount and frequency of medicament administered will depend upon many factors and no concise dosage rate or regimen can be generally stated. However, as a guide we have found that, where the compounds are administered by inhalation to a patient suffering from acute allergic asthma, therapeutically useful results are achieved when the compounds are administered at a dosage rate of from 0.1 to 50 mgs. Where the compounds are administered by the oesophagal route, larger dosages may be given.

The invention thus also provides a method for inhibiting the effects of an antibody-antigen reaction which comprises the prior application to the known or expected area of the antibody-antigen reaction of a therapeutically effective amount of a compound of Formula I or of a pharmaceutically acceptable derivative thereof.

The compounds of the invention may be prepared from compounds of the formula

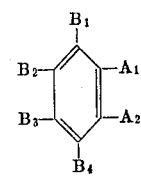

wherein $A_1$ and $A_2$ together form the chain $-CO-CR_1=C(COOH)O-$, a chain convertible thereto such as a $-CO-CR_1=C(D)O-$ or $-COCHR_1-CH(D)O-$ chain (wherein D is a $COOR_2$ group or a group convertible thereto and $R_2$ is hydrogen or an alkyl group containing from one to 10 carbon atoms), are groups convertible to the desired chain or to a chain convertible thereto, or are derivatives or precursors of such groups or chains; one or more adjacent pairs of the groups $B_1$, $B_2$, $B_3$ and $B_4$ are the groups $A_1$ and $A_2$, the pairs of groups $A_1$ and $A_2$ may have the same or different values except that all pairs of groups cannot form $-CO-CR_1=C(COOH)O-$ chains; and the remainder of the groups $B_1$, $B_2$, $B_3$ and $B_4$ are hydrogen or appropriate substituents.

It will be appreciated that the compounds of the invention possess at least two

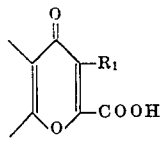

rings and that these may be the same. Each of these rings may be introduced in separate stages by different or similar methods or may be introduced together in a single reaction stage. It is also possible to introduce in separate stages precursors of one of the desired rings, for example a chain —CO—CH$_2$—CH(COOH)—O—, by one method, to introduce the same or another precursor for the other ring, e.g., a chain —CO—CH(CH$_3$)—CH(COOH)—O— by a different method, and then to convert the two precursors into the desired rings in a final common reaction stage, e.g., by dehydrogenation. For convenience the preparation of the compounds of the invention will be described in terms of the conversion of only one of the pairs of groups A$_1$ and A$_2$ to the desired

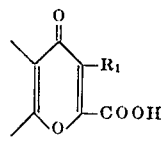

ring. The other ring may be present initially, be formed during the formation of the first ring, or be introduced later by the same or a different process. Where both rings are to be introduced one after another it may be necessary to shield or block the sites at which the second ring is to be introduced. Such shielding or blocking may be achieved by conventional methods as indicated above. The general formula for the starting material,

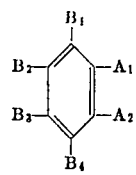

is therefore to be construed as covering compounds which may be converted to those containing the desired —COCR$_1$=C(COOH)—O— chain by the same or different methods. It is however preferred that the pairs of groups A$_1$ and A$_2$ have the same values and that each pair is converted to the desired chain by the same method in the same reaction process.

The conversion of the A$_1$ and A$_2$ group in the compound

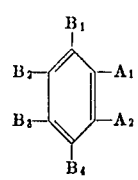

may be achieved by a variety of methods. For example the desired

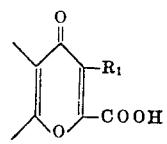

ring may be formed by cyclizing compounds of the general formulas:

II

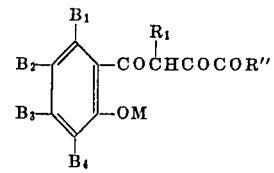

wherein R'' is an OH group or a group convertible thereto and M is hydrogen, an alkali-metal cation or an alkyl group;

III

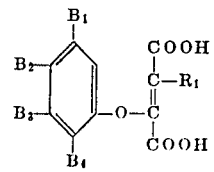

and

IV

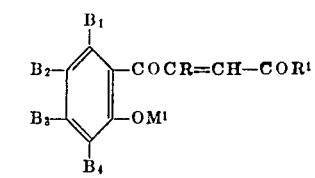

wherein M$^1$ is hydrogen or an alkali-metal cation, with oxidation or dehydrogenation of the product if required. The desired ring may also be formed by modification of an already formed chromone or chromanone ring [i.e., compounds wherein A$_1$ and A$_2$ together form the chain —CO—CR$_1$=C(D)—O— or —CO—CHR$_1$—CH(D)—O—], for example by oxidation of substituents in the 2-position of the ring, by dehydrogenation or by intra molecular rearrangement (for example by a Wesseley-Moser rearrangement)

The compounds of formula II may be readily cyclized, for example by heating under non-basic conditions. It is preferred to carry out the cyclization reaction in a non-reactive solvent such as ethanol or dioxan. It is also preferred to carry out cyclization in the presence of a cyclization catalyst, ideally an acid cyclization catalyst such as a polyphosphoric acid, sulphuric acid, hydrochloric acid, acetic acid or mixtures thereof. When a compound is used wherein M is in alkyl group, simultaneous cyclization and dealkylation may be achieved by the use of hydroiodic or hydrobromic acid as the cyclization catalyst.

Cyclization may be carried out at from ambient temperature to about 100° C., for example by heating the reaction mixture on a steam bath and, where the nature of the reaction medium permits it, under atmospheric reflux.

As indicated earlier, the group R'' in the compound of Formula II is an OH group, or a group which is convertible to an OH group. Such conversion may have already occurred in the cyclization of the compound or may have taken place prior to cyclization. However, where this is not the case, such conversion may be readily achieved using conventional methods. Thus, amino or halogen groups may be hydrolized with a mild alkali, such as sodium carbonate, or an acid.

Alternatively, the R'' group may be converted into a more desirable derivative, for example an alkoxy group, and such further conversion is also within the scope of this invention.

The compounds of Formula II may themselves be prepared by a number of methods. For example, an acylbenzene of the formula:

V

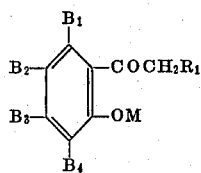

(wherein $R_1$ has the value given above and M is hydrogen, an alkali metal cation or an alkyl group, such as a lower alkyl group, e.g., a methyl, ethyl, propyl or pentyl group), may be condensed with a compound of the formula $R_3 CZ—CZR_4$ wherein $R_3$ and $R_4$ may be the same or different, one being a group reactive with an hydrogen in the —CO—$CH_2R_1$ group of the acylbenzene, the other being an R'' group, and each Z is a carbonyl oxygen or one is an $(Hal)_2$ group wherein Hal is halogen. Suitable groups which react with a —CO—$CH_2R_1$ group include alkoxyl, amino, alkyl amino, substituted amino or substituted alkyl amino groups. It will be appreciated that these groups include groups which are also convertible to OH groups. Where $R_3$ and/or $R_4$ is an amino or substituted amino group, the nitrogen atom may carry groups E and F wherein E and/or F is hydrogen, a lower alkyl, a substituted or unsubstituted aryl, alkaryl or haloaryl group. In the case where the nitrogen carries only one group E or F, the substituent may be linked to the nitrogen through a sulphur atom or an —SO— or —$SO_2$— group. Examples of suitable compounds for present use include those of the general formulas $R_5OOC—COOR_5$ (wherein each $R_5$ is an alkyl group, such as methyl, ethyl, propyl, butyl group, or pentyl group; an alkaryl group such as a benzyl group; or an alkenyl group such as an allyl group), and $R_5O—C(Hal)_2—COOR_2$ (wherein Hal is halogen, preferably chlorine or bromine). Preferred compounds of formula $R_3CZ—CZR$ for present include diethyloxalate, ethyl ethoxydichloroacetate, ethyl oxamate, ethyl oxalylanilide and ethyl oxalyl-p-toluene sulphonamide.

The condensation of the acylbenzene V with the compound of formula $R_3CZ—CZR_4$ may be carried out merely by mixing the reactants together and heating, if desired, to a temperature of from 25° to 150° C., preferably about 70° to 80° C. In the case of the oxalate esters, the reaction is desirably carried out in the presence of a condensation agent. Suitable agents include for example, metal alkoxides, such as sodium ethoxide, sodium hydride, sodamide or metallic sodium. The condensation agent may be formed in situ, for example by the use of ethanol as the reaction medium and the addition of metallic sodium. In some cases the alkali metal salt of the compound of Formula V (that is when M is alkali metal) may act as part of the condensation agent required. Where a substituted dihaloacetate is used, it is preferred to carry out the reaction in the presence of a finely divided metal catalyst, such as finely divided platinum group metal.

If desired, the reaction may be carried out in an inert solvent or diluent medium, such as diethyl ether, dioxan, ethanol, benzene, toluene, tetrahydrofuran, or mixtures thereof.

The reactants are conveniently employed in substantially stoichiometric proportions. If desired, an excess of either may be employed, for example in from 100 to 300 molar percent excess. When used, the condensation agent is desirably used in from 200 to 750 molar percent based on the amount of the acylbenzene of formula V used, preferably from 200 to 500 molar percent.

It will be appreciated that the condensation reaction is desirably carried out under substantially anhydrous conditions, that is in the absence of initial or added water.

The reaction mixture of the above reaction will usually contain the compound of formula II, or a precursor thereof, though in some cases cyclization of the product to the compound of formula I, or a salt or derivative thereof, may take place spontaneously. Cyclization of the compound of formula II may also be achieved in situ by acidifying the reaction mixture. It is usually preferred to recover the compound of formula II from the reaction mixture and to cyclize it in the presence of a cyclization agent under substantially anhydrous conditions as described above. The compound may be recovered from the crude reaction mixture wherein it was prepared by conventional techniques. Thus, for example, the reaction mixture may be treated with ether to precipitate the intermediate, if this precipitation had not already been achieved by the use of ether as the reaction medium. The precipitate, after any further washing with ether, may be dissolved in water and acidified to yield the compound of formula II which usually separates out and may be recovered by, for example, filtration, centrifuging, or by extraction with a suitable solvent such as chloroform or ethyl acetate and evaporation of the solvent. It may be preferred to omit the ether precipitation step and merely acidify the reaction mixture and recover the product by solvent extraction.

The compound of formula II may also be prepared by the reaction of an acylbenzene of formula V wherein M is hydrogen or an alkali-metal cation with a dicarbonyl compound of formula $R_3COCOR_4$ wherein $R_3$ and $R_4$ have the values given above, except that one or both of $R_3$ and $R_4$ are halogen. Suitable dicarbonyl compounds for use in this case include oxalylchloride and compounds wherein $R_3$ is chlorine or bromine and $R_4$ is OH, alkoxy (e.g., methoxy or ethoxy) $NH_2$ phenylamino or a p-toluene sulphonyl-amino group. The reaction using these halo compounds may be carried out in a manner similar to that described in relation to the use of the other compounds $R_3 CZCZR_4$, except that an acid-binding agent is used in place of the condensation agent and that the use of an anhydrous organic solvent is desirable. Suitable acid-binding agents include alkalis, such as sodium or potassium carbonate, sodium, sodamide and alkali metal alkoxides; and organic amines such as pyridine or triethylamine. The acid-binding agent is present in at least the theoretically stoichiometric amount to bind all the halogen in the dicarbonyl compound. It may be desired to use an excess of acid-binding agent, and, if desired, the acid-binding agent may be added to the reaction mixture in a series of additions over a period of time. In some cases the acid-binding agent may be used as the reaction medium. The reaction mixture from this process will usually contain the intermediate product of the formula

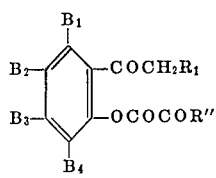

or a precursor or derivative thereof, though in some cases rearrangement of this intermediate to yield the compound of formula II may have occurred spontaneously. Rearrangement of the intermediate may also be achieved in situ by the addition of an alkali and heating. However it is usually preferred to recover the intermediate product from the reaction mixture and rearrange it, after any purification that may be desired, in a separate reaction step. The recovery and purification of the intermediate product may be achieved by conventional methods.

Rearrangement of the intermediate product may be achieved by heating the crude, or purified, recovered material under non-acidic conditions and preferably in an inert solvent or diluent medium such as benzene, dioxan, anisole or the like. The non-acidic conditions may be achieved by the presence of a base, such as pyridine and potassium hydroxide or monoethylamine, or of an alkali such as sodium carbonate or potassium carbonate, sodium hydride, sodium alkoxides e.g. sodium methoxide, or metallic sodium. If desired, the rearrangement may be carried out under the influence of heat, for example at from ambient temperature to 100° C., e.g., by heating on a steam bath and, where the reaction mixture permits it, under atmospheric reflux. Preferably the rearrangement is carried out under anhydrous conditions i.e. in the absence of appreciable amounts of initial or added water. The amount of alkali present may be from 100 to 1,000 molar percent, based on the amount of the intermediate product being rearranged and may, if desired, be added in a single addition or in a series of additions over a period of time.

The compound of Formula II or a derivative or precursor thereof, may be recovered from the reaction mixture in which it was formed by conventional methods with, if necessary, conversion of the R'' group into a more desired substituent.

In a further process for preparing the compounds of formula II, an appropriately substituted salicylic acid or ester thereof is reacted with a compound of the formula $CH_3CO\,COOR_5$ wherein $R_5$ has the values given above. The reaction is desirably carried out in an inert medium such as ethanol, anisole, benzene or dioxan and it is preferred to employ a condensation agent such as an alkali metal alkoxide (e.g., sodium ethoxide), sodamide, sodium hydride or metallic sodium.

The compounds of Formula III may be cyclized by treating the compound with a cyclization agent at ambient temperature or above. Suitable cyclizing agents include dehydrating agents such as phosphorus pentoxide, polyphosphoric acid, sulphuric acid, chlorsulphonic acid and other Lewis acids. In certain cases it is also possible to use glacial acetic acid containing a small amount of hydrochloric or hydrobromic acid. It will be appreciated that, since cyclization is achieved in these cases by the use of dehydrating agents, the presence of added or initial water in the reaction mixture is undesirable. It is usually preferred to subject the compounds of Formula III to an initial drying step and to carry out the cyclization reaction under substantially anhydrous conditions.

Alternatively, cyclization may be achieved by converting the free carboxyl groups of the compound of Formula III into acyl chloride groups, for example, by treatment with $PCl_3$ or $PCl_5$, and subjecting the resultant acyl chloride to an internal Friedel Crafts reaction.

The compounds of Formula III when $R_1$ is hydrogen may be obtained by the reaction of the phenol of formula:

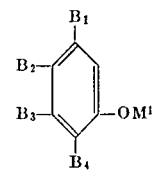

(wherein $M^1$ is hydrogen or an alkali metal cation) with an acetylene dicarboxylic acid or ester thereof under alkaline conditions to produce a product which, upon hydrolysis, yields the compound of Formula III. The acetylene dicarboxylic acid esters may be derived from alcohols having from one to 10 carbon atoms. However, since the ester moiety is to be eliminated, it is preferred to use simple esters derived for example, from methyl, ethyl, propyl, or butyl alcohols. It is preferred that both carboxylic acid groups on the acetylene dicarboxylic acid be esterified. In this process the ester and phenol are reacted, preferably in approximately stoichiometric amounts, under alkaline conditions. These may be achieved by the presence of an organic base such as benzyl trimethyl ammonium hydroxide, or of an alkali metal hydroxide. However, it is convenient to have the alkali present in the form of an alkali metal salt, especially the sodium salt, of the reactant phenol, such a salt being considered as free phenol when assessing the amount of phenol present in the reaction mixture. Where this is done, the alkali metal phenate may conveniently be made in situ in the reaction mixture by the addition of metallic sodium. The alkali is believed to act catalytically and it is possible to use less than 100 molar percent thereof based on the phenol present. We prefer to use substantially 10 molar percent. It will be appreciated that the reaction, especially where the alkali metal phenate is formed in situ, is desirably carried out under substantially anhydrous conditions. It is also preferred to carry out the reaction in a solvent or diluent medium. Suitable media included, for example, excess of the reactant phenol, diphenyl ether, dioxan and anisole. These media have the advantage that the reaction may be carried out at elevated temperatures at atmospheric pressure. It is generally preferred to carry out the reaction at temperatures of from 50° to 100° C.

In place of the acetylene dicarboxylic acid ester used in the above process for the preparation of the compound of Formula III, an ester of a mono-halofumaric acid, or a precursor thereof may be used, i.e., esters of acids of the general formula

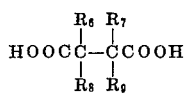

wherein $R_8$ is halogen and $R_9$ is an $R_1$ group when $R_6$ and $R_7$ together form a carbon to carbon bond; or, any two of $R_6$, $R_7$, $R_8$ and $R_9$ are halogen, one of the other two is hydrogen and the second is an $R_1$ group. In this case the reaction is not an addition reaction but a condensation reaction which involves at some stage the elimination of the elements of a halogen acid from between the phenol and the halofumeric ester. This acid must be eliminated from the system and the reaction is therefore carried out in the presence of at least sufficient of an acid-binding agent to eliminate the elements of the halogen acid which will be formed during the overall process. The elements of the halogen acid are not necessarily eliminated in one step, but may be eliminated firstly as a proton and then as a halogen anion. The term acid-binding agent is therefore used in this context to denote both conventional acid-binding agents, such as pyridine and triethylamine, and materials which eliminate for example, first the hydrogen from the phenol (to form a phenate salt) and then are displaced from the phenate salt to form a salt with the halogen of the halofumaric acid ester. Apart from the use of a different acid ester reactant and the presence of the acid-binding agent, the process may be carried out in similar manner to that when an acetylene dicarboxylic acid ester is used. Since the acid-binding agent is usually also a strong alkali, there is generally no need to provide a separate strong alkali in the reaction mixture. As will be appreciated from the general formula for the acids which may be used to react with the phenol, the use of the monohalofumaric acid or precursors thereof permits the introduction of an $R_1$ group into the molecule.

As indicated above, it is also possible to use compounds which yield the desired halofumaric acid esters under the conditions of the reaction with the phenol. Such other compounds or precursors, include halomaleic acid esters and dihalosuccinic acid esters. When precursors are used, it may be necessary to provide extra alkali to ensure conversion of the precursor to the desired halofumaric acid ester. Such alkali may be merely an excess of the acid-binding agent.

The products obtained from the reactions outlined immediately above usually contain the compounds of Formula III in the form of their esters. The compounds of Formula III may be recovered from these products by acidification of the reaction mixture; subsequent hydrolysis of the esters by boiling with alkali and acidification to liberate the free acid, removal of organic solvent or diluent medium (if any) and extraction of the aqueous solution with, for example, ether which may thereafter be evaporated. The solvent extraction of the acid may be carried out as indicated, or may occur after hydrolysis of the ester of compound III if desired. The product may, if necessary, be subjected to further purification, for example by extracting the ethereal solution with sodium bicarbonate and then precipitating the acid of Formula III by addition of dilute sulphuric acid.

The compounds of Formula IV may be cyclized by treatment with an alkali or organic base in a suitable inert solvent to give the 2-carboxychromanone derivative. This may subsequently be converted into the 2-carboxychromone derivative by heating with selenium dioxide or other suitable dehydrogenation agents such as palladium black in an inert solvent as is detailed below. Simultaneous oxidation and cyclization to the desired 2-carboxychromone derivative may be brought about by the introduction of a suitable oxidant into the cyclization stage (e.g., selenium dioxide in an inert solvent using benzyltrimethylammonium hydroxide as the cyclizing base).

Where non-oxidizing conditions are used for the cyclization step, the product will be the analogous chromanone compound from which the desired

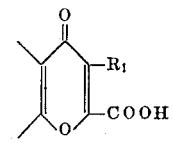

ring compound may be prepared as detailed later.

The compounds of Formula IV may be prepared by reacting an acylbenzene of Formula V wherein M is hydrogen or an alkali-metal cation with glyoxalic acid or an ester thereof in the presence of a base (e.g., aqueous sodium hydroxide) or a mineral acid. A water miscible solvent, e.g., alcohol, may be added to facilitate the reaction.

Alternatively a phenol of formula VI wherein $M^1$ is hydrogen is heated at a temperature of, for example, 25° to 150° C. with maleic anhydride in a solvent or diluent medium, such as nitrobenzene or carbon disulphide, in the presence of a Lewis acid such as an excess of aluminum trichloride. The complex which is produced by this process may then be decomposed with a dilute mineral acid, such as hydrochloric acid, and the solvent removed, for example by distillation. The residue, which contains the compound of Formula IV wherein R'' is OH, may be recovered using conventional techniques and then purified by, for example, recrystallization. However, as indicated below the reaction may proceed to give a 2-carboxychromanone directly without isolation of an intermediate.

In the processes outlined above, we believe that the compounds II to IV are all necessary intermediates in the conversion of the various starting materials to the compounds of Formula I. However, in many cases the intermediates are formed under those conditions required to achieve cyclization and therefore exist only transitorily. While, for clarity, these processes have been described as if the compounds II to IV were necessarily isolated prior to cyclization, the invention embraces those processes wherein the intermediate undergoes cyclization without separation or isolation from the reaction mixture in which it has been prepared.

As indicated above, the desired

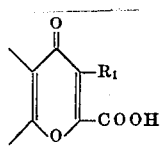

ring may also be formed from an already present chromone ring, i.e., from a compound of formula

VII

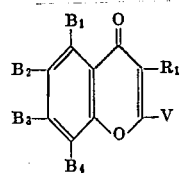

wherein V is a group which is convertible to a —COOR$_2$ group. Examples of suitable V groups include nitrile and ester groups which may be hydrolized to a carboxylic acid group; alkyl or substituted alkyl groups such as methyl, hydroxymethyl, halomethyl (e.g., chloromethyl, bromomethyl, dichloromethyl, trichloromethyl), acyl groups such as formyl or acetyl groups, and alkenyl and aryl alkenyl groups such as vinyl, ω-trichloromethylvinyl and styryl groups, all of which are groups oxidizable or hydrolyzable to a carboxylic acid group. The conversion of the V group to a COOH group or derivative thereof may be achieved using any of the known methods.

The compounds of Formula VII may be prepared by a variety of methods, many of which are closely analogous to the processes described above for the preparation and cyclization of the compounds of Formula II to IV except that in place of the starting materials II, III and IV, compounds of the formulas

VIII

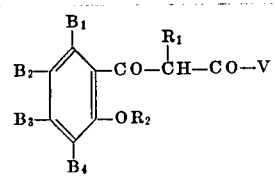

IX

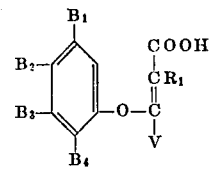

and

X

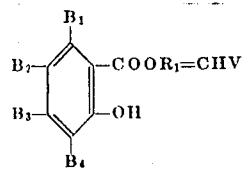

are used and that the final product requires conversion of the V group to the —COOH group or derivation thereof. Such analogous processes may together by broadly described as a process for preparing a compound of Formula I by conversion of a compound of the formula

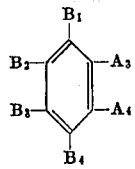

(wherein A$_3$ and A$_4$ are the pairs of groups —COCHR$_1$COD and OM; H and —O—C(D)=CR$_1$COOH; or —COCR$_1$=CHD and OM$^1$ respectively wherein D is a COOR$_2$ group or a group V convertible thereto, M is H, an alkali-metal cation or an alkyl group, M$^1$ is H or an alkali metal cation and R$_1$ and R$_2$ have the values given above; one adjacent pair of the substituents B$_1$, B$_2$, B$_3$ and B$_4$ is the groups A$_5$ and A$_6$ which may have the values given above for A$_1$ and A$_2$ or may be the pair of groups A$_3$ and A$_4$, and the other two of the groups B$_1$, B$_2$, B or B$_4$ are hydrogen or substituents other than hydrogen) during which cyclization of the groups A$_3$ and A$_4$ and, if necessary, A$_5$ and A$_6$ takes place.

Thus the compounds of Formula VII may be prepared by cyclizing a compound of Formula VIII under the conditions described above for the cyclization of the compound of Formula II. In some instances cyclization may occur spontaneously.

The compounds of Formula VIII may themselves be prepared by condensing an acylbenzene of Formula V with a compound of formula VCOR$_3$, wherein V has the values given above and R$_3$ is a group reactive with a hydrogen in the —COCH$_2$R$_1$ group of the acylbenzene. Suitable compounds VCOR$_3$ include esters of substituted or unsubstituted acetic, acrylic and cinnamic acids, and the like, and amides or substituted amides. The condensation may be achieved by the method outlined earlier for the production of the compounds of formula II from the acylbenzene V and the compounds R$_3$CZ—CZR$_4$.

The compounds VIII may also be prepared from the acylbenzene V and the compounds VCOR$_3$ wherein R$_3$ is halogen via, if necessary, the rearrangement of a compound of the formula:

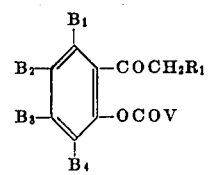

using conditions similar to those set out above for the preparation of the compounds of Formula III by the analogous route.

Particular examples of the preparation of compounds VIII include the preparation of those compounds wherein V is a methyl group by reaction of an alkyl acetate, i.e., the compound VCOR₃ wherein V is a methyl group and R₃ is an alkoxy group, with an acylbenzene V under the condensation conditions outlined above for the preparation of compound II.

The 2-styryl compound, that is the compound of Formula VIII wherein V is

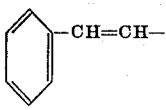

may be prepared from the acylbenzene V by reaction with sodium cinnamate and cinnamic anhydride or by reaction with a cinnamoyl halide, e.g., cinnamoyl chloride, in the presence of an acid-binding agent to yield the cinnamate ester of the acylbenzene, followed by rearrangement with a base, e.g., potassium carbonate, in the presence of an inert solvent such as toluene or benzene, to give a 1, 3-diketone of the formula:

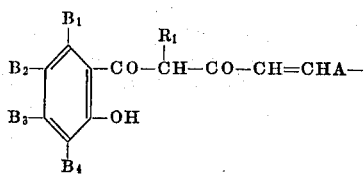

wherein Ar denotes a benzene ring.

From these examples of the preparation of the compounds of Formula VIII it will be appreciated that certain of the processes for preparing the compounds of Formulas II and VIII may together be broadly described as processes wherein an acylbenzene of Formula V is reacted with a compound

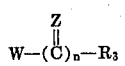

wherein $R_3$ is a group reactive with an hydrogen in the —COCH₂R₁ group of the acylbenzene, each Z is 0 or one may be a (Hal)₂ group, n is 1 or 2 and when n is 1, W is a D group i.e. a COOR₂ group or a group V convertible thereto and when n is 2, W is an R″ group, i.e., an OH group or a group convertible thereto.

The compounds of Formula IX may be prepared by the reaction of a phenol of Formula VI with a substituted acetylene monocarboxylic acid, or ester in manner similar to that used to prepare the compounds of Formula III above. The acetylene monocarboxylic acids, or esters thereof, for present use have the general formula VC≡C—COOR₂ wherein V and R₂ have the values given above. It is preferred that R₂ be a lower alkyl group such as a methyl or ethyl group. It is also possible to use precursors of acetylene monocarboxylic acids or esters, for example the mono-halo-ethylenic and dihalo-ethane analogues thereof.

The compounds of formula IX may be cyclized in a manner similar to that employed with the compounds of Formula III. As with the compounds of Formula II and VIII, the preparation of the compounds of Formula III and IX may together be broadly described as a process wherein a phenol of Formula VI is reacted with a compound of the formula

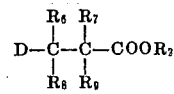

wherein $R_2$, $R_6$, $R_7$, $R_8$, $R_9$ and D have the values given above and also the further value that when $R_6$ and $R_7$ together form a carbon to carbon bond, $R_8$ and $R_9$ may also form a carbon to carbon bond.

The compounds of Formula X may also be prepared and cyclized in a manner similar to that used to prepare and cyclize the compound of Formula IV. Thus, an acylbenzene of Formula V may be reacted with an aldehyde of the formula OHCV, for example cinnamaldehyde, under substantially the same conditions as are used to prepare the compound of Formula IV from glyoxallic acid. However, it may be preferred to employ acylbenzenes of formula V wherein M is an alkyl group and to dealkylate the reaction product to obtain the compound of Formula X.

As with the other intermediate compounds, certain routes for the preparation of the compounds of Formula IV and X may together be broadly described as comprising the reaction of an acylbenzene of Formula V with a compound of the formula OHCD wherein D has the values given above.

In addition to producing the compounds of formula VII by the methods outlined above, a number of other methods may be readily devised which do not necessarily pass through the intermediate compounds VIII, IX or X. Thus, the 2-formyl compound may be prepared by the reaction of an acylbenzene of formula V with a substituted acetic acid or ester thereof of the formula (R₂O)₂CH-COOR₂, for example ethyl diethoxy acetate. In this case an acetal compound is produced as an intermediate, which may be hydrolized with, for example, a dilute mineral acid to yield the desired —CHO group. Other routes which may be specified include: the condensation of a diketene with an appropriate enamine; the condensation of an alkyl alkoxalylacetate with an appropriate phenol or resorcinol in the presence of phosphorus pentoxide.

In addition to the direct conversion of a compound of Formula VII into the desired compound of Formula I, the V group in compounds of Formula VII may be converted in known manner from one form of substituent into another more preferred substituent.

Thus, the compound of Formula VII wherein V is a methyl group also serves as an intermediate in the preparation of a number of other oxidizable derivatives. For example, the methyl group may be converted into the corresponding 2-halo-methyl compound, e.g., by reaction with hydrogen chloride and manganese dioxide in boiling acetic acid to produce the 2-chloromethyl compound; or by reaction with bromine in acetic acid to yield the 2-bromomethyl compound. The 2-halomethyl compound may be oxidized to the corresponding 2-carboxylic acid using, for example, chromium trioxide as oxidizing agent in the presence of acetic acid.

The 2-methyl compound may also be reacted with p-nitrosodimethylaniline and the reaction product hydrolyzed with dilute mineral acid to give the corresponding 2-formyl compound which may be oxidized to the corresponding 2-carboxylic acid using, for example, chromium trioxide as reagent.

Condensation of the 2-methyl compound with a benzaldehyde in the presence of condensation catalyst gives the 2-styryl compound which may be oxidized to the corresponding 2-carboxylic acid using, for example, potassium permanganate. The 2-formyl compound may also serve as a starting point for the preparation of the 2-cyano compound. Thus, the 2-formyl compound may be reacted with hydroxylamine to yield the 2-oximino compound which may, after dehydration to give the 2-cyano compound, be hydrolyzed to the 2-carboxylic acid or amide thereof, under acid conditions.

As stated earlier the compounds of Formula I may also be prepared by conversion of a chain —CO—CHR$_1$—CH(D)—O— to the desired —CO—CR$_1$=C(COOH)O— chain. This conversion may go via a compound of Formula VII when the group D is a group V, or may procede directly to the compound of formula I or a derivative thereof. Thus, the compounds of Formula I may also be prepared from corresponding chromanone compounds by dehydrogenation followed, or preceded, by oxidation or hydrolysis of any substituent in the 2-position if this is necessary. The dehydrogenation may be effected by, for example, the use of selenium dioxide, palladium black or chloranil. Alternatively, dehydrogenation may be carried out by bromination followed by dehydrobromination. Thus, the chromanone may be brominated using N-bromosuccinimide in an inert solvent or by treatment with pyridinium perbromide in an inert solvent such as chloroform in the presence of a free radical catalyst such as benzoyl peroxide, to yield the 3-bromo derivative which may be subsequently dehydrobrominated. The chromanones themselves may be obtained by the action of an β-substituted β-chloropropionic acid or derivative thereof on resorcinol in the presence of a basic reagent followed by conversion of the acid function to the acid chloride and treatment with aluminum chloride in the presence of a suitable solvent (e.g., nitrobenzene); or by the action of a phenol on a β-substituted acrylonitrile, e.g., propenylnitrile with subsequent hydrolysis and cyclization of the product. As indicated above, cyclization of the intermediates IV and X may lead to the production of a corresponding chromanone compound, which may then be converted as outlined above to the desired chromone compound.

In addition to the above outlined methods for preparing the compounds of Formula I via the intermediates II to IV and VII to X, other methods may be devised which do not necessarily produce any of these intermediates. Thus, an acetylhalide, acetic anhydride or acetic acid may be condensed with an oxalate ester of the type R$_{10}$OOC—COOR$_{11}$ wherein R$_{10}$ is an aryl group and R$_{11}$ is an alkyl or an aryl group, the condensation being carried out in the presence of a Lewis acid. The oxalate ester may itself be obtained by the esterification of a phenol of Formula VI with the appropriate oxalyl halide. Alternatively the compounds of Formula I may be obtained by reacting a phenol of Formula VI with ethyl ethoxalyl acetate and subsequently cyclizing the product, if necessary, e.g., by heating in a solvent medium. In a further process a 2-carboxy-pyrone of the formula

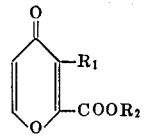

is reacted with a furan of the formula

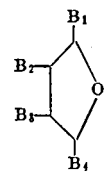

to yield the intermediate

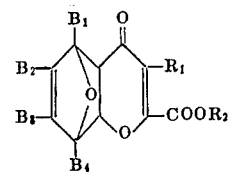

which may be converted, for example by dehydration, to the compound.

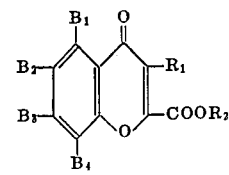

As stated earlier, the desired

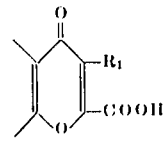

rings may be introduced in separate steps or in the same step. Where they are both to be introduced together, the two pairs of groups A$_1$ and A$_2$ will have the same values, appropriate to the method used to introduce the rings. Thus, where condensation with an acylbenzene forms one of the steps required, one group in each pair will be a —COCH$_2$R$_1$ group and the other will be an OM group.

From the above examples of the conversion of the starting materials

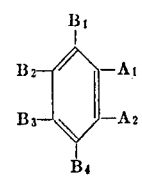

into the desired

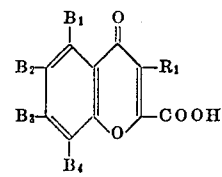

compounds, it will be seen that many of the routes may be together broadly described as the conversion of compounds wherein $A_1$ and $A_2$ together form the groups $-OM$ and $-H$, $-D$ or $-COD$; $-H$ and $-OCD=CRCOOR_2$; $-OCOCOR''$ and H or $COCH_2R_1$ respectively wherein D is a group $-CH_2R_1$, $-OR_2$, $-CHR_1COD$ or $-CR_1=CHD$ and $R''$, $R_1$, $R_2$, D and M have the values given above; or wherein $A_1$ and $A_2$ together form the chains $-CO-CR_1=C(D)O-$ or $-COCHR_1-CH(D)O-$; $B_1$, $B_2$, $B_3$ and $B_4$ having the values set out above.

The processes outlined above may produce the free acids of Formula I or may yield derivatives thereof. It is also within the scope of the present invention to treat the product of any of the above processes, after any isolation and purification steps that may be desired, in order to liberate the free acid therefrom or to convert one form of derivative into another. The methods used to free the acid, convert one derivative into another and to isolate and purify any product may be those conventionally used.

Furthermore, it is also within the scope of this invention to introduce the substitutents P, Q, R, T, P', Q', R', and T' after formation of one or both the

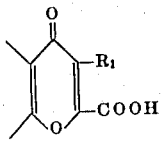

rings has taken place. Such introduction may be achieved by any of the known methods. As indicated earlier, it is also within the scope of this invention to block or shield sites or groups which might be detrimentally affected during the introduction of the

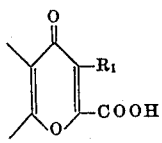

ring or rings. Such shielding or blocking groups include, for example, amino, substituted amino e.g., acylated amino, carboxyl, $SO_3H$, tert. butyl, cyano or nitro groups. These groups may be removed after introduction of the ring or rings to leave unsubstituted positions which may, if desired, thereafter be substituted.

Certain of the intermediates formed in the production of the compounds of formula I are, we believe, novel. The invention therefore also provides as novel compounds, compounds of the general Formulas II, III, IV, VII, VIII, IX and X set out above, except those wherein $A_1$ and $A_2$ are the pairs of groups OM and H or $COCH_2R_1$; notably those compounds wherein one pair of the groups $A_1$ and $A_2$ forms the chain $-COCR_1=C(D)-O-$ or $-CO-CHR_1-CH(D)O-$. Preferred compounds are those wherein each pair of groups $A_1$ and $A_2$ are the same, other than a chain $-COCR_1=C(COOH)O-$.

The invention will be illustrated by the following Examples in which all parts and percentages are by weight unless otherwise stated:

EXAMPLE 1

4,10-Dioxo-5-methoxy-2,8-dicarboxy-4H,10H-benzo (1,2-b:-3,4-b')dipyran a. 4,10-Dioxo-5-methoxy-2,8-dicarboxy-4H,10H-benzo (1,2,-b:-3,4-b') dipyran, monohydrate To a stirred solution of sodium ethoxide in ethanol, prepared from 3.04 parts of sodium and 40 parts of ethanol, was added a slurry of 3.7 parts of 2,4-diacetyl-5-methoxyresorcinol and 12.05 parts of diethyl oxalate in 20 parts of ethanol and 50 parts of diethyl ether. The mixture was stirred and heated under reflux for 4 hours.

Diethyl ether and water were added, and the aqueous layer was separated and acidified with dilute hydrochloric acid. The aqueous solution was extracted with ethyl acetate dried over sodium sulphate, filtered and evaporated to dryness to leave a brown oil.

This oil was dissolved in boiling ethanol and 0.5 parts of concentrated hydrochloric acid were added. The solution was heated under reflux for 10 minutes and the solvent was then removed under reduced pressure to leave a brown oil.

This oil was triturated with ether to give a solid which was shown by thin layer chromatography to be a mixture of acid and ester. The solid was heated in aqueous sodium bicarbonate solution until it had all dissolved. This solution was cooled and acidified with dilute hydrochloric acid to give 0.96 parts of 4, 10-dioxo-5-methoxy-2,8-dicarboxy-4H,10H-benzo(1,2-b:-3,4-b') dipyran, monohydrate as a pale brown solid, melting point 262'-3° C.(d).

Analysis:
Found: C 51.7% H 3.02%
$C_{15}H_8O_9 \cdot H_2O$ requires: C 51.5% H 2.86% b. 4,10-Dioxo-5-methoxy-2,8-dicarboxy-4H,10H-benzo (1,2-b:-3,4-b') dipyran, disodium salt A solution of 0.83 parts of 4, 10-dioxo-5-methoxy-2,8-dicarboxy-4H,10H-benzo (1,2-b:-3,4-b') dipyran monohydrate and 0.4 parts of sodium bicarbonate in 50 parts of water was freeze-dried to give 0.83 parts of 4,10-dioxo-5-methoxy-2,8-dicarboxy-4H, 10H-benzo (1,2-b:3,4-b') dipyran disodium salt as a pale yellow solid.

EXAMPLE 2

4,10-Dioxo-2,8-dicarboxy-5-hydroxy-4H,10H-benzo (1,2-b: 3,4-b') dipyran a. 4,10-Dioxo-2,8-dicarboxy-5-hydroxy-4H,10H-benzo (1,2-b: 3,4-b')dipyran monohydrate.

A solution of 0.55 parts of 4,10-dioxo-2,8-dicarboxy-5-methoxy-4H,10H-benzo (1,2-b: 3,4-b') dipyran monohydrate (Prepared as in Example 1) in a mixture of 7 parts of hydrogen bromide-acetic acid (45% w/v) and 7 parts of glacial acetic acid was refluxed for 1½ hours. During this time, a solid separated out of the reaction mixture. The mixture was poured into 200 parts of water and the solid precipitate was filtered off.

The solid was dissolved in aqueous bicarbonate solution and the solution treated with charcoal and filtered. Acidification of the bicarbonate solution with dilute hydrochloric acid gave 0.3 parts of 4,10-dioxo-2,8-dicarboxy-5-hydroxy-4H,10H-benzo (1,2-b: 3,4-b') dipyran monohydrate as a pink solid, melting point 300° – 2° C. (d).

Analysis:
    Found: c, 49.8%  H, 2.14%
    $C_{14}H_6O_9 \cdot H_2O$ requires: C, 50.01%  H, 2.4% b. 4,10-Dioxo-2,8-dicarboxy-5-hydroxy-4H,10H-benzo (1,2-b: 3,4-b') dipyran disodium salt A solution of 0.238 parts of 4,10-dioxo-2,8-dicarboxy-5-hydroxy-4H,10H-benzo (1,2-b: 3,4-b') dipyran monohydrate and 0.113 parts of sodium bicarbonate in 30 parts of water was freeze-dried to give 0.23 parts of 4,10-dioxo-2,8-dicarboxy-5-hydroxy-4H,10H-benzo (1,2-b: 3,4-b') dipyran disodium salt as a buff colored solid.

EXAMPLE 3

4,10-Dioxo-5-methyl-2,8-dicarboxy-4H,10H-benzo (1,2-b:3,4-b') dipyran

To a solution of 3.1 parts of anhydrous orcinol in 50 parts of anhydrous dioxan were added 0.23 parts of sodium. The mixture was stirred and heated until the sodium had dissolved. The stirred solution was then treated dropwise with a solution of 7.5 parts of dimethyl acetylene dicarboxylate in 20 parts of anhydrous dioxan. After stirring and heating on a steam-bath for 15 minutes, the mixture was cooled and acidified with 9 parts of 10% w/v sulphuric acid solution. It was then treated with 25 parts of 25% w/v sodium hydroxide solution; heated on steam-bath for one hour; cooled; acidified with 10% w/v sulphuric acid solution; and the dioxan was then distilled off. The mixture was extracted with ether and the ether evaporated to leave a yellow solid which was crystallized from water to give 1.0 parts of orcinol di(trans, 1,2-dicarboxy vinyl) ether, melting point, 260°–1° C.

Analysis
    Found : C, 50.92%  H, 3.59%
    $C_{15}H_{12}O_{10}$ requires : C, 51.15%  H, 3.41%

The structure was confirmed by nuclear magnetic resonance spectrum.

A mixture of 0.5 parts of orcinol di(trans, 1,2-dicarboxy vinyl) ether and 15 parts of polyphosphoric acid was stirred and heated at 110°–20° for 3 hours. The mixture was cooled and diluted with ice-water. The supernatant liquid was decanted off and the precipitated solid was filtered off, washed with water and dried in the oven to leave 0.3 parts of 4,10-dioxo-5-methyl-2,8-dicarboxy-4H, 10H-benzo (1,2-b; 3,4-b') dipyran sesquihydrate, melting point, 285°–6° C. (Decomp).

Analysis
    Found : C, 52.22%  H, 3.02%
    $C_{15}H_8O_8 \cdot 1\frac{1}{2}H_2O$ requires : C, 52.49%  H, 3.2%

The material was shown to be identical with the free acid obtained by reaction of diethyloxalate and 2,4-diacetylresorcinol using the method of Example 1 by comparison of melting points and infra-red spectra. The mixed melting point gave no depression.

EXAMPLE 4

2,8-Dicarboxy-4,10-dioxo-5-methoxy-4H,10H-benzo (1,2-b: 3,4-b') dipyran

A mixture of 5-methoxy-2,4-diacetylresorcinol (20 parts) and ethyl ethoxydichloracetate (52 parts) was heated at 150° to 170° C. for 5 hours. After evaporating off any volatile material under reduced pressure, a mixture was obtained which was hydrolyzed by dissolving in glacial acetic acid containing 17% of concentrated hydrochloric acid (500 parts total) and refluxing for 4 hours. After cooling, a solid was obtained. This solid was filtered off, washed well with water and purified by dissolving in aqueous sodium bicarbonate, treating the hot solution with charcoal, filtering and precipitating with concentrated hydrochloric acid. The product, 2,8-dicarboxy-4,10-dioxo-5 methoxy -4H,10H-benzo (1,2-b; 3,4-b') dipyran monohydrate, was shown to be identical with the product of Example 1a.

EXAMPLE 5

2,8-Dicarboxy-4,10-dioxo-5-methoxy-4H,10H-benzo (1,2-b;

3,4-b') dipyran monohydrate

A solution of 5-methoxy-2,4-diacetylresorcinol (1 part) and ethyl N-toluene-p-sulphonyloxamate (10 parts) in 80 parts by volume of dry ethanol and 10 parts by volume of dioxan, was added to a solution of 1.3 parts of sodium in 100 parts by volume of ethanol. The resultant mixture was heated under reflux for 20 hours. After cooling the mixture, a large excess of ether (500 parts) was added and the mixture was extracted with water. The aqueous extract was acidified and extracted into chloroform and filtered to remove by-product bis (N,N' toluene -p-sulphonyl) oxamide. The chloroform solution was dried and evaporated to dryness, yielding a sticky solid which was washed several times with ether, the ethereal extracts being separated by decantation, to leave a further amount of bis (N, N' toluene-p-sulphonyl) oxamide. The ethereal extracts on evaporation gave an oil which was dissolved in ethanol (20 parts) containing a few drops of concentrated hydrochloric acid. This solution was refluxed for 15 minutes and the solvent removed in vacuo to yield a brown oil.

Thin layer chromatography showed that this oil was probably a mixture of the desired acid and its ester. The mixture was therefore hydrolyzed with aqueous sodium bicarbonate. Heating of the hydrolysis mixture was continued until complete solution was achieved. The solution was then treated with charcoal, filtered and acidified to yield 2,8-dicarboxy-4,10-dioxo-5-methoxy-4H,10H-benzo (1,2-b: 3,4-b') dipyran monohydrate which was shown to be identical to the product obtained in Example 1a.

EXAMPLE 6

2,3-Dicarboxy-4, 10-dioxo-5-methoxy-4H, 10H-benzo (1,2-b: 3,4-b') dipyran monohydrate Ethyl oxalylchloride (8 parts) was added slowly to a mixture of 2,4-diacetyl-5-methoxyresorcinol (2.5 parts) and anhydrous pyridine (10 parts) cooled in ice. The mixture was kept at room temperature for 24 hours and then heated for 30 minutes on a steam bath. After cooling and pouring onto a mixture of ice and hydrochloric acid, an oil was obtained which was extracted with chloroform, washed and the chloroform solution then dried over sodium sulphate. After filtration and removal of the solvent, the residue was crystallized from ethanol to give 2,8-dicarboxy-4,10-dioxo-5-methoxy -4H, 10H-benzo (1,2-b: 3,4-b') dipyran monohydrate which was shown to be identical with the product of Example 1a.

EXAMPLE 7

2,8-Dicarboxy-4, 10-dioxo-5-methoxy-4H, 10H-benzo (1,2-b: 3,4-b') dipyran monohydrate.

A mixture of phloroglucinol monomethyl ether (2 parts) and ethyl ethoxalylacetate (10 parts) in diphenyl ether (30 parts) was heated for 4 hours at 150° C. The reaction vessel was fitted with an air condenser, so that volatile reaction products, such as water and ethanol, could escape from the reaction mixture. After cooling, the reaction mixture was triturated with an excess of petroleum ether (b.p. 60°–80° C.) several times, to leave a sticky gum. Aqueous sodium bicarbonate was added to this gum and the mixture heated on a steam bath until solution of the gum was achieved. Acidification of the solution gave 2,8-dicarboxy-4, 10-dioxo-5-methoxy-4H, 10H-benzo (1,2-b: 3,4-b') dipyran monohydrate which was shown to be identical with the product of Example 1a.

EXAMPLE 8

2,8-Diethoxycarbonyl-4, 10-dioxo-4H, 10H-benzo (1,2-b: 3,4-b') dipyran

Resacetophenone (7.6 parts) and dimethyl acetylene dicarboxylate (15 parts) were mixed together and 3 drops of benzyltrimethylammonium hydroxide (40% aqueous solution) were added. The resulting solution was heated on a steam bath for 1 hour and then cooled, treated with sodium hydroxide (45 parts of 25% aqueous solution) and heated on a steam bath for 3 hours. The mixture was then cooled and acidified with sulphuric acid (20% $H_2SO_4$), A precipitate was slowly deposited, which was filtered off, washed with water and crushed to leave a fawn powder. This powder was crystallized from water to give 3.5 parts of 3-hydroxy-4-acetylphenoxyfumaric acid hemi-hydrate.

Analysis:
Found: C, 52.8% H, 3.89%
$C_{12}H_{10}O_7 \cdot \frac{1}{2} H_2O$ required: C, 52.4% H, 4.00%
Melting point 217° C. (d)

A mixture of this material and concentrated sulphuric acid (18 parts) was stirred until a clear solution was obtained. The solution was then heated on a steam bath for 10 minutes, cooled and poured onto ice. A fine green precipitate was obtained which settled under gravity. This precipitate was filtered off, washed with water and dried. The dried powder was crystallized from ethanol to give 0.9 parts of 5-hydroxy-6-acetylchromone-2-carboxylic acid, whose structure was confirmed by NMR evidence.

Analysis:
Found: C, 58.0% H, 3.26%
$C_{12}H_8O_6$ requires: C, 58.1% H, 3.23 %
Melting point 262° C. (d)

This product (0.5 parts) was mixed with diethyl oxalate (5 parts by volume) in dry ethanol (20 parts by volume) and the mixture added to a solution of sodium (0.5 parts) in dry ethanol (50 parts by volume). The resultant solution was stirred and heated under reflux for 16 hours, cooled and poured into a large volume of ether. The mixture was extracted several times with water and the aqueous extracts acidified. The acidified aqueous extracts were then extracted with chloroform (three 50 part lots). The chloroform extracts were washed with water, dried and evaporated to dryness leaving an oil. This oil was dissolved in dry ethanol (20 parts) and the solution saturated with hydrogen chloride by passing a stream of dry hydrogen chloride through the solution. This mixture was kept overnight and then refluxed for 1 hour. The ethanol was evaporated and iced water added to the residue to give a sticky solid. The water was decanted and the solid crystallized from ethanol to give 2,8-diethoxycarbonyl-4, 10-dioxo-4H, 10H-benzo (1,2-b: 3,4-b') dipyran which was shown to be identical to the ester obtained when 2,4-diacetylresorcinol was reacted with diethyl oxalate using the process of Example 1.

EXAMPLE 9

2,8-Dicarboxy-4, 6-dioxo-10-nitro-4H, 6H-benzo (1,2-b: 5,4-b') dipyran

Powdered aluminum chloride (15 parts) was added with stirring to a solution of 2-nitroresorcinol (3.5 parts) and maleic anhydride (5.5 parts) in ethylene dichloride (200 parts). After standing at room temperature for 20 hours, the mixture was warmed to 80° C. for 1 hour, cooled and filtered to give a yellow residue. This residue was added with stirring to a mixture of crushed ice (20 parts), concentrated hydrochloric acid (10 parts) and chloroform (100 parts). The mixture was allowed to separate into two layers. After 30 minutes the organic layer was removed, the aqueous layer extracted with further lots of chloroform and the chloroform extracts combined with the organic layer. The combined organic layer was dried over sodium sulphate and the chloroform evaporated off in vacuo to give a reddish brown oil which was taken up in amyl alcohol (50 parts) and selenium dioxide (3 parts) was added. The mixture was refluxed for 18 hours. The inorganic materials were then removed by centrifuging and decanting. The organic layer was then steam distilled to remove the solvent and purified by dissolution in sodium bicarbonate, treatment with charcoal, filtration and precipitation with concentrated hydrochloric acid to give 2,8-dicarboxy-4, 6-dioxo-10-nitro-4H, 6H-benzo (1,2-b: 5,4-b') dipyran which was identical to the compound obtained when 2,4-diacetyl-6 nitroresorcinol was reacted with diethyl oxalate using the method of Example 1.

EXAMPLE 10

2,8-Dicarboxy-4, 6-dioxo-10 methyl-4H, 6H-benzo (1,2-b: 5,4-b') dipyran a. 3,7-Diacetyl-2,8-dimethyl-4,6-dioxo-10-methyl-4H, 6H-benzo (1,2-b: 5,4-b') dipyran)

A mixture of 4,6-diacetyl-2-methylresorcinol (10.4 parts), sodium acetate (15 parts) and acetic anhydride (90 parts) was heated under reflux for 4 hours. The mixture was cooled and then poured onto ice. A brown oil was precipitated and the aqueous layer was decanted therefrom. The oil was washed with water. Hydrochloric acid (150 parts, 15% HCl) was added to the oil and the mixture heated to boiling. On cooling, a brown crystalline solid was obtained which was filtered off, suspended in boiling ethanol for 15 minutes and, after cooling, filtered off to yield 3, 7-diacetyl-2,8-dimethyl-4, 6-dioxo-10-methyl-4H, 6H-benzo (1,2-b: 5,4-b') dipyran.

Analysis:
Found: C 67.5% H 4.56%
$C_{19}H_{16}O_6$ requires: C 67.0% H 4.71%
Melting point 280°–285° C.

b. 2,8-Dimethyl-4,6-dioxo-10-methyl-4H, 6H-benzo (1,2-b: 5,4-b') dipyran

A mixture of 3,7-diacetyl-2,8-dimethyl-4, 6-dioxo-10-methyl-4H, 6H-benzo (1,2-b: 5,4-b') dipyran (0.9 parts are prepared above), sodium carbonate (2.0 parts) and water (40 parts) was heated under atmospheric reflux for 1.5 hours. The resulting solution was acidified and the precipitated solid was filtered off, washed with water, and crystallized from ethanol to give 2,8-dimethyl-4,6-dioxo-10-methyl-4H, 6H-benzo (1,2-b: 5,4-b') dipyran (0.5 parts) as a yellow solid.

c. 2,8-Dicarboxy-4, 6-dioxo-10-methyl-4H, 6H-benzo (1,2-b: 5,4-b') dipyran hemihydrate Finely divided selenium dioxide (1.2 parts) was added to a mixture of 2,8-dimethyl-4,6-dioxo-10-methyl-4H, 6H-benzo (1,2-b: 5,4-b') dipyran (1.0 part as prepared above) and dioxan (20 parts). The resulting mixture was heated under atmospheric reflux for 8 hours. After cooling the reaction mixture, the selenium precipitate was filtered off and the solvent removed from the filtrate by evaporation in vacuo. The solid residue was extracted with aqueous sodium bicarbonate. The extract was acidified with dilute hydrochloric acid and the precipitated solid filtered off to give 2,8-dicarboxy-4,6-dioxo-10-methyl-4H 6H-benzo (1,2-b: 5,4-b') dipyran hemihydrate. The product had a melting point of 292°–4° C. and was shown to be identical to the product obtained by the reaction of 4,6-diacetyl-2-methylresorcinol with diethyl oxalate using the process of Example 1.

EXAMPLE 11

2,8-Dicarboxy-4,6-dioxo-10-methyl-4H, 6H-benzo (1,2-b: 5,4-b') dipyran a. 2,8-Dimethyl-4,6-dioxo-10-methyl-4H, 6H-benzo (1,2-b: 5,4-b') dipyran A mixture of powdered sodium (2.3 parts), 4,6-diacetyl-2 methylresorcinol (2.08 parts) and ethyl acetate (70 parts) was stirred and heated under gentle atmospheric reflux for 4 hours. The resulting solution was cooled and diluted with diethyl ether (100 parts). A solid was precipitated, filtered off, and extracted with water. The aqueous extract was acidified with dilute hydrochloric acid and an oil precipitated. The oil was extracted into ethyl acetate. The organic solution was dried over sodium sulphate, filtered and the solvent removed to yield an oil. This oil was heated under atmospheric reflux for 15 minutes with ethanol (20 parts) and concentrated hydrochloric acid (0.5 parts). The solid which crystallized out from the reaction mixture on cooling was filtered off to give 2,8-dimethyl-4, 6-dioxo-10-methyl-4H, 6H-benzo (1,2-b: 5,4-b') dipyran which was identical to that obtained in step b of Example 10.

b. The 2,8-dimethyl-4,6-dioxo-10-methyl-4H, 6H-benzo (1,2-b: 5,4-b') dipyran was oxidized to the corresponding 2,8-dicarboxyl-4,6-dioxo-10-methyl-4H,6H-benzo (1,2-b: 5,4-b') dipyran hemihydrate by the method of step (c) of Example 10.

EXAMPLE 12

2,8-Dicarboxyl-4, 6-dioxo-10-methyl-4H, 6H-benzo (1,2-b: 5,4-b') dipyran a. 2,8-Distyryl-4, 6-dioxo-10-methyl-4H, 6H-benzo (1,2-b: 5,4-b') dipyran A slurry of 2,8-dimethyl-4,6-dioxo-10-methyl-4H, 6H-benzo (1,2-b: 5,4-b') dipyran (2.6 parts, prepared as in Example 10 or 11) and benzaldehyde (2.12 parts) in ethanol (20 parts) was added to a stirred solution of sodium ethoxide in ethanol, which had been prepared by dissolving sodium (0.46 parts) in ethanol (20 parts). The mixture was stirred and heated under atmospheric reflux for 4 hours and then left to stand at room temperature for 18 hours. The supernatant liquor was decanted from the brown oil which had precipitated. The oil was washed by trituration with ether and not purified further, to yield 2,8-distyryl-4,6-dioxo-10-methyl-4H, 6H-benzo (1,2-b: 5,4-b') dipyran.

b. 2,8-Dicarboxyl-4, 6-dioxo-10-methyl-4H, 6H-benzo (1,2-b: 5,4-b') dipyran hemihydrate The crude 2,8-distyryl-4, 6-dioxo-10-methyl-4H, 6H-benzo (1,2-b: 5,4-b') dipyran obtained by the above process was dissolved in pyridine (50 parts) and aqueous potassium permanganate solution (105 parts of 5% solution) was added. The mixture was stirred at room temperature for several hours. The presence of excess permanganate was checked from time to time and further amounts of 5% solution were added as required. When no further oxidation took place, the solution was acidified with dilute hydrochloric acid and decolorized with sulphur dioxide. The precipitate was filtered off, washed with water and extracted into aqueous sodium bicarbonate solution. Upon acidification of the solution, a precipitate was formed which was filtered off and dried to yield 2,8-dicarboxy-4, 6-dioxo-10-methyl-4H, 6H-benzo (1,2-b: 5,4-b') dipyran hemihydrate, which was shown to be identical with the product of Examples 10 and 11.

EXAMPLE 13

6-Bromo-2,8-dicarboxy-4,10-dioxo-5-hydroxy-4H, 10H-benzo 1,2-b: 3,4-b') dipyran.

a. 2,8-Diethoxycarbonyl-4,10-dioxo-5-hydroxy-4H, 10H-benzo (1,2-b: 3,4-b') dipyran A solution of 2,8-dicarboxy-4,10-dioxo-5-hydroxy-4H, 10H-benzo (1,2-b: 3,4-b') dipyran monohydrate (1.76 parts prepared as in Example 2) and concentrated sulphuric acid (0.5 parts) in ethanol (150 parts) was refluxed for 4 hours. The solid obtained on cooling was filtered off to give 1.85 parts of 2,8-diethoxycarbonyl-4, 10-dioxo-5-hydroxy-4H, 10H-benzo (1,2-b: 3,4-b') dipyran (1.35 parts) as a brown solid.

Analysis:
Found: C 57.0% H 3.81%
$C_{18}H_{14}O_9$ requires: C 57.7% H 3.77%
Melting point 171° C.

b. 6-Bromo-2,8-diethoxycarbonyl-4,10-dioxo-5-hydroxy-4H, 10H-benzo (1,2-b: 3,4-b') dipyran To a solution of 2,8-Diethoxycarbonyl-4,10-dioxo-5-hydroxy-4H, 10H-benzo (1,2-b: 3,4-b') dipyran (0.5 parts as prepared above) in glacial acetic acid (10 parts) was added a solution of bromine (0.1 parts) in glacial acetic acid. The solution was heated at 100° C. for 6 hours and then the acetic acid was evaporated. The oily product was triturated with cold ethanol and the resulting solid was filtered off to give 6-bromo-2,8-diethoxycarbonyl-4,10-dioxo-5-hydroxy-4H, 10H-benzo (1,2-b: 3,4-b') dipyran (0.4 parts) as a pale brown solid, melting point 199°–202° C.

c. 6-Bromo-2,8-dicarboxy-4, 10-dioxo-5-hydroxy-4H, 10H-benzo (1,2-b: 3,4-b') dipyran trihydrate A solution of 6-bromo-2,8-diethoxycarbonyl-4, 10-dioxo-5-hydroxy-4H, 10H-benzo (1,2-b: 3,4-b') dipyran (0.4 parts as prepared above) in aqueous ethanol (25 parts) was hydrolyzed with sodium bicarbonate. Acidification of the bicarbonate solution with dilute hydrochloric acid gave 6-bromo-2,8-dicarboxy-4, 10-dioxo-5-hydroxy-4H, 10H benzo (1,2-b: 3,4-b') dipyran trihydrate (0.1 parts) melting point 312° C.(d).

Analysis:
Found: C, 37.0 H, 1.82%
$C_{14}H_5O_9Br3H_2O$ requires: C, 37.25 H, 2.44% d. 6-Bromo-2,8-dicarboxy-4,10-dioxo-5-hydroxy-4H, 10H-benzo (1,2-b: 3,4-b') dipyran disodium salt A solution of 6-bromo-2,8-dicarboxy-4, 10-dioxo-5-hydroxy-4H, 10H-benzo (1,2-b: 3,4-b') dipyran trihydrate (0.08 parts) and sodium bicarbonate (0.035 parts) in water (10 parts) was freeze dried to give 6-bromo-2,8-dicarboxy-4, 10-dioxo-5-hydroxy-4H, 10H-benzo (1,2-b: 3,4-b') dipyran disodium salt (0.08 parts).

EXAMPLE 14

The processes described in Examples 1 to 13 were repeated using different reactants and Table I sets out the products obtained, the Example number of the process route employed and the physical characteristics of the products, where measured.

TABLE I

| Name of Compound | Example Number of Preparative Route | Physical data, where measured | | |
|---|---|---|---|---|
| | | Melting Point in °C | Analysis Found | |
| | | | C % | H % Other % |
| 4,6-dioxo-2,8-diethoxycarbonyl-4H,6H-benzo (1,2-b;5,4-b') dipyran | 1 | 225–6 | 60.34 | 3.85 |
| 4,6-dioxo-2,8-dicarboxy-4H,6H-benzo (1,2-b;5,4-b') dipyran, disodium salt | 1 | | 46.6 | 1.67 |
| 4,10-dioxo-2,8-diethoxycarbonyl-4H,10H-benzo (1,2-b;3,4-b') dipyran | 1 | 183–4 | 60.79 | 3.74 |
| 4,10-Dioxo-2,8-dicarboxy-4H,10H-benzo (1,2-b;3,4-b'), dipyran disodium salt | 1 | | 44.6 | 2.09 |
| 5-Benzyloxy-4,10-dioxo-2,8-diethoxycarbonyl-4H,10H-benzo (1,2-b;3,4-b') dipyran | 1 | 210–212 | 64.8 | 4.21 |
| 5-Benzyloxy-4,10 dioxo-2,8-dicarboxy-4H,10H-benzo (1,2-b;3,4-b') dipyran sesquihydrate | 1 | 272–5 | 57.6 | 3.42 |
| 5-Benzyloxy- 4,10-dioxo-2,8-dicarboxy-4H,10H-benzo (1,2-b;3,4-b') dipyran, disodium salt | 1 | | | |
| 4,10-Dioxo-5-methyl-2,8-dicarboxy-4H, 10H-benzo (1,2-b;3,4-b') dipyran sesquihydrate | 1 (via ethyl ester) | 287 (decomp) | 52.22 | 3.02 |
| 4,10-Dioxo-5-methyl-2,8-dicarboxy-4H,10H-benzo (1,2-b;3,4-b') dipyran | | | | |

| | | | | |
|---|---|---|---|---|
| disodium salt | 1 | | | |
| 5-Methoxy-4,6-dioxo-2,8-diethoxycarbonyl-4H,6H-benzo (1,2-b:-5,4b') dipyran | 1 | 227–8 | 59.0 | 4.20 |
| 5-Methoxy-4,6-dioxo-2,8-dicarboxy-4H,6H-benzo (1,2b:-5,4b') dipyran disodium salt | 1 | | 11.93 Na | |
| 4,10-Dioxo-6-ethyl-2,8-dicarboxy-4H,10H-benzo (1,2-b: 3,4-b') dipyran monohydrate | 1 (via ethyl ester) | 282 | 55.6 | 3.23 |
| 4,10-Dioxo-6-ethyl-2,8-dicarboxy-4H,10H-benzo (1,2-b: 3,4-b') dipyran disodium salt | 1 | | | |
| 4,6;Dioxo-2,8-dicarboxy-10-methyl-4H,6H-benzo (1,2-b: 5,4-b') dipyran hemihydrate | 1 (via ethyl ester) | 293–4 | 55.78 | 2.51 |
| 4,6-dioxo-2,8-dicarboxy-10-methyl-4H, 6H-benzo (1,2-b: 5,4-b') dipyran disodium salt | 1 | | | |
| 4,6-Dioxo-2,8-dicarboxy-10-ethyl-4H,6H-benzo(1,2-b:5,4;b') dipyran hemihydrate | 1 | 315 | 57.2 | 2.95 |
| 4,6-Dioxo-2,8-dicarboxy-10-ethyl-4H, 6H-benzo (1,2-b:5,4-b') dipyran disodium salt | 1 | | | |
| 4,6-Dioxo-2,8-diethoxycarbonyl-10-ethyl-4H, 6H-benzo (1,2-b: 5,4-b') dipyran | 1 | 189–91 | 61.9 | 4.98 |
| 4,6-Dioxo-2,8-diethoxycarbonyl-10-nitro-4H,6H-benzo (1,2-b:5,4-b') dipyran | 1 | 215 | 53.9 | 3.14 3.36N |
| 4,6-Dioxo-2,8-dicarboxy-10-nitro-4H, 6H-benzo (1,2-b: 5,4-b') dipyran hemihydrate | 1 | 225–7 | 44.1 | 2.31 3.5N |
| 4,6-Dioxo-2,8-dicarboxy-10-nitro-4H, 6H-benzo (1,2-b: 5,4-b') dipyran disodium salt | 1 | | | |
| 6,10-dicarboxy-4-methyl-2,8,12-trioxo-2H,8H,12H-benzo (1,2-b: 3,4-b': 5,6-b'') tripyran trihydrate | 1 | 263–7 | 49.6 | 2.96 |
| 6,10-dicarboxy-4-methyl-2,8,12-trioxo-2H,8H,12H-benzo (1,2-b: 3,4-b': 5,6-b'') tripyran disodium salt | 1 | | | |
| 6-bromo-2,8-diethoxycarbonyl-4,10-dioxo-5-hydroxy-4H,10H-benzo (1,2-b: 3,4-b') dipyran | 1 | 199–202 | 46.5 | 2.87 |
| 6-bromo-2,8-dicarboxy-4,10-dioxo-5-hydroxy-4H,10H-benzo (1,2-b:3,4-b') dipyran dihydrate | 1 | 312(d) | 37.0 | 1.82 |
| 6-bromo-2,8-dicarboxy-4,10-dioxo-5-hydroxy-4H,10H-benzo (1,2-b:3,4-b') dipyran disodium salt | 1 | | | |
| 4,10-dioxo-6-chloro-2,8-dicarboxy-4H,10H-benzo (1,2-b:3,4-b') dipyran monohydrate | 2 | 286–7 | 47.1 | 1.62 |
| 4,10-dioxo-6-chloro-2,8-dicarboxy-4H,10H-benzo (1,2-b:3,4-b') dipyran disodium salt | 2 | | | |
| 4,10-dioxo-2,8-dicarboxy-5-allyloxy-4H,10H-benzo (1,2-b:3,4-b') dipyran hemihydrate | 1 | 250–3(d) | 55.8 | 3.30 |
| 4,10-dioxo-2,3-dicarboxy-5-allyloxy-4H, 10H-benzo (1,2-b:3,4-b') dipyran disodium salt | 1 | | | |

Example 15

10-Butyl-2,8-dicarboxy-4,6-dioxo-4H,6H-benzo [1,2-b: 5,4-b'] dipyran a. 4,6-Diacetyl-2-n-butylresorcinol A mixture of 5.0 parts of 2,6-diacetoxybutylbenzene and 6.65 parts of aluminum chloride was heated at 130° C. for 1 hour. After cooling, the melt was treated with ice and 3.0 parts of concentrated hydrochloric acid to give a greenish solid. This solid was dissolved in petroleum ether (60°–80°) and cooled in cardice. The yellow crystals were filtered off at a temperature of less than 0° C., melting point 43°–9 C. This solid crystallized from aqueous ethanol to give 4,6-diacetyl-2-n-butylresorcinol as colorless needles, melting point 61°–4° C.

Analysis  
Found: C, 67.0 H, 7.25%  
$C_{14}H_{18}O_4$ requires: C, 67.18 H, 7.25% b. 10-Butyl-2,8-diethoxycarbonyl-4,6-dioxo-4H,6H-benzo [1,2-b: 5,4-b'] dipyran

To a stirred solution of 2.1 parts of sodium in 60 parts of dry ethanol was added a slurry of 2.5 parts of 4,6-diacetyl-2-n-butylresorcinol and 7.3 parts of diethyl oxalate in 50 parts of dry ethanol. The mixture was stirred and heated under reflux for 4 hours.

After cooling, the mixture was poured into a separating funnel containing ethyl acetate and dilute hydrochloric acid. The ethyl acetate layer was separated, dried over sodium sulphate and evaporated to leave an oil.

This oil was dissolved in 100 parts of ethanol containing 2.0 parts of concentrated hydrochloric acid and the solution was heated under reflux for 30 minutes. The volume was reduced to 50 ml. then the solution was allowed to cool whence a solid crystallized. This solid was recrystallized from ethanol to give 10-butyl-2,8-diethoxycarbonyl-4,6-dioxo-4H,6H-benzo [1,2-b: 5,4-b'] dipyran as colorless needles, melting point 155°–157° C.

Analysis  
Found: C, 63.7 H, 5.33%  
$C_{22}H_{22}O_8$ requires: C, 63.76 H, 5.35% c. 10-Butyl-2,8-dicarboxy-4,6-dioxo-4H,6H-benzo [1,2-b: 5,4-b'] dipyran hemihydrate portion was extracted repeatedly with 2N sodium hydroxide solution, which was then acidified to give 2,6-diacetyl-3-allyloxy-5-benzyloxyphenol as pale yellow needles, melting point 92°–92.5° C.

Analysis
Found: C, 70.6 H, 5.84%
$C_{20}H_{20}O_5$ requires: C, 70.6 H, 5.92% b. 2,6-Diacetyl-3-allyloxy-5-benzyloxyanisole

A mixture of 6 parts of 2,6-diacetyl-3-allyloxy-5-benzyloxyphenol, 6.5 parts of anhydrous potassium carbonate, 7.5 parts of dimethyl sulphate, and 100 parts of dry acetone was refluxed with stirring for 16 hours. The mixture was diluted with water, acidified, and extracted with ether, which was washed with water, dried and evaporated to yield an oil. The oil solidified on standing and was recrystallized from aqueous ethanol after treatment with charcoal to give, 2,6-diacetyl-3-allyloxy-5-benzyloxy-anisole as prisms, melting point 77°–78° C.

Analysis
Found: C, 71.2 H, 6.29%
$C_{21}H_{22}O_5$ requires: C, 71.2 H, 6.26% c. 4,6-Diacetyl-5-methoxy-2-propylresorcinol

Under an atmosphere of nitrogen 6.6 parts of 2,6-diacetyl-3-allyloxy-5-benzyloxyanisole and 15 parts of tetralin were refluxed for 4 hours. The mixture was cooled, diluted with light petroleum (b.p. 40°–60°) and extracted repeatedly with 2N sodium hydroxide. The combined alkaline extracts were washed with light petroleum, acidified, and extracted with ether, which was then evaporated to give 2.4 parts of a red oil. The oil was taken up in 100 parts of ethanol containing 2 drops of concentrated hydrochloric acid, and hydrogenated at 45 p.s.i. for one hour over 0.5 parts of 5% palladium on charcoal. The mixture was filtered and evaporated to yield 1.7 parts of a red oil, which was repeatedly extracted with hot light petroleum (b.p. 40°–60°). The extracts were evaporated and distilled at 150°–170° C/0.6 mm to give a viscous oil, which was crystallized from aqueous ethanol to afford 4,6-diacetyl-5-methoxy-2-propylresorcinol as needles, melting point 80° C.

Analysis
Found: C, 63.3 H, 6.6%
$C_{14}H_{18}O_5$ requires: C, 63.1 H, 6.81% d. 2,8-Diethoxycarbonyl-5-methoxy-4,6-dioxo-10-propyl-4H,6H-benzo [1,2-b: 5,4-b'] dipyran.

By the method of Example 15 (b) 4.0 parts of 4,6-diacetyl-5-methoxy-2-propylresorcinol were converted into 2,8-diethoxycarbonyl-5-methoxy-4,6-dioxo-10-propyl-4H,6H-benzo [1,2-b: 5,4-b'] dipyran, melting point 168°–168.5° C.

Analysis
Found: C, 61.4 H, 5.08%
$C_{22}H_{22}O_9$ requires: C, 61.4 H, 5.15% e. 2,8-Dicarboxy-5-methoxy-4,6-dioxo-10-propyl-4H,6H-benzo [1,2-b: 5,4-b'] dipyran By the method of Example 15 (c) 2.4 parts of 2,8-diethoxy-carbonyl-5-methoxy-4,6-dioxo-10-propyl-4H,6H-benzo [1,2-b: 5,4-b'] dipyran were converted into 2,8-dicarboxy-5-methoxy-4,6-dioxo-10-propyl-4H,6H-benzo [1,2-b: 5,4-b'] dipyran, melting point 278°–279° C.(d).

Analysis
Found: C, 57.8 H, 3.74%
$C_{18}H_{14}O_9$ requires: C, 57.8 H, 3.77% f. 2,8-Dicarboxy-5-methoxy-4,6-dioxo-10-propyl-4H,6H-benzo [1,2-b: 5,4-b'] dipyran disodium salt By the method of Example 15 (d) 0.567 parts of 2,8-dicarboxy-5-methoxy-4,6-dioxo-10-propyl-4H,6H-benzo [1,2-b: 5,4-b'] dipyran were converted into 2,8-dicarboxy-5-methoxy-4,6-dioxo-10-propyl-4H,6H-benzo [1,2-b: 5,4-b'] dipyran disodium salt.

Example 19

2,8-Dicarboxy-5-methoxy-4,10-dioxo-6-propyl-4H,10H-benzo

[1,2-b: 3,4-b'] dipyran a. 2,4-Diacetyl-6-allyl-5-methoxyresorcinol

A mixture of 15.5 parts of 2,4-diacetyl-5-allyloxyresorcinol, 8.6 parts of anhydrous potassium carbonate, 10 parts of methyl iodide, and 80 parts of acetone was refluxed for 16 hours. Most of the acetone was removed and the residue was diluted with water, acidified, and extracted with ether, which yielded 17 parts of an oil on evaporation. The oil was refluxed with 17 parts of tetralin for 3.5 hours. The mixture was cooled and poured into 2N sodium hydroxide solution. The aqueous layer was washed with benzene, and then extracted repeatedly with ethyl acetate. The combined ethyl acetate portions were evaporated to give a solid, which crystallized from aqueous ethanol to afford f2,4-diacetyl-6-allyl-5-methoxy-resorcinol as long fibrous needles, melting point 84.5°–85° C.

Analysis
Found: C, 63.9 H, 6.18%
$C_{14}H_{16}O_5$ requires: C, 63.6 H, 6.10% b. 2,4-Diacetyl-5-methoxy-6-propylresorcinol

An ethanolic solution of 1.3 parts of 2,4-diacetyl-6-allyl-5-methoxyresorcinol was hydrogenated at 45 p.s.i. for 2 hours over 0.5 parts of 5% palladium on charcoal. The mixture was filtered and evaporated to give a green oil which crystallized from aqueous ethanol to afford 2,4-diacetyl-5-methoxy-6-propylresorcinol as long needles, melting point 48°–49° C.

Analysis
Found: C, 62.7 H, 6.85%
$C_{14}H_{18}O_5$ requires: C, 63.1 H, 6.76% c. 2,8-Diethylcarbonyl-5-methoxy-4,10-dioxo-6-propyl-4H,10H-benzo [1,2-b: 3,4-b'] dipyran A solution 2.0 parts of 10-butyl-2,8-diethoxycarbonyl-4,6-dioxo-4H,6-benzo [1,2-b: 5,4-b'] dipyran and 1.22 parts of sodium bicarbonate in aqueous ethanol was heated till thin layer chromatography showed that the ester had been completely hydrolyzed. The solution was then cooled and acidified with dilute hydrochloric acid to give a white precipitate. This solid was filtered off and boiled with ethanol. This procedure left 0.8 parts of 10-butyl-2,8-dicarboxy-4,6-dioxo-4H,6H-benzo [1,2-b: 5,4-b'] dipyran hemihydrate as the insoluble product, melting point 314° C. (d).

Analysis
Found: C, 59.4 H, 3.9%
$C_{18}H_{14}O_8 \cdot \frac{1}{2}H_2O$ requires: C, 58.9 H, 4.1% d. 10-Butyl-2,8-dicarboxy-4,6-dioxo-4H,6H-benzo [1,2-b: 5,4-b'] dipyran disodium salt A solution of 0.6 parts of 10-butyl-2,8-dicarboxy-4,6-dioxo-4H,6H-benzo [1,2-b: 5,4-b'] dipyran hemihydrate and 0.27 parts of sodium bicarbonate in 50 parts of water was freeze-dried to give 10-butyl-2,8-dicarboxy-4,6-dioxo-4H,6H-benzo [1,2-b: 5,4-b'] dipyran disodium salt.

Example 16

2,6,10-Tricarboxy-4,8,12-trioxo-4,8,12-trioxo-4H,8H, 12H-benzo [1,2-b: 3,4-b':5,6-b''] tripyran a. 2,6,10-Tricarboxy-4,8,12-trioxo-4H,8H,12H-benzo [1,2-b: 3,4-b': 5,6-b''] tripyran hemihydrate To a stirred solution of 2.76 parts of sodium in 50 parts of dry ethanol was added a slurry of 2.52 parts of triacetylphloroglucinol and 11.0 parts of diethyl oxalate in 50 parts of dry ethanol. The mixture was stirred and heated under reflux for 4 hours.

After cooling, the mixture was poured into a separating funnel containing a mixture of ethyl acetate and dilute hydrochloric acid. The ethyl acetate layer was separated, dried over sodium sulphate and evaporated to leave an oil. This oil was dissolved in 50 parts of ethanol containing 0.5 parts of concentrated hydrochloric acid and the solution was refluxed for 30 minutes. The volume was then reduced to 30 ml. and allowed to cool whence a brown solid crystallized out. This solid was redissolved in aqueous ethanol and treated with sodium bicarbonate. The solution was then heated till thin layer chromatography showed that hydrolysis was complete. The solution was cooled and acidified to give 2,6,10-tricarboxy-4,8,12-trioxo-4 H,8H,12-benzo [1,2-b: 3,4-b': 5,6-b''] tripyran hemihydrate as a yellow solid, melting point 275°–277° C.

Analysis
Found: C, 51.2 H, 1.70%
$C_{18}H_6O_{12} \cdot \frac{1}{2}H_2O$ requires: C, 51.1 H, 1.65% b. 2,6,10-Tricarboxy-4,8,12-trioxo-4H,8H,12H-benzo [1,2-b: 3,4-b': 5,6-b''] tripyran trisodium salt By the method of Example 15 (d) 0.088 parts of 2,6,10-tricarboxy-4,8,12-trioxo-4H,8H,12H-benzo [1,2-b: 3,4-b': 5,6-b''] tripyran hemihydrate was converted into 2,6,10-tricarboxy-4,8,12-trioxo-4H,8H,12H-benzo [1,2-b: 3,4-b': 5,6-b''] tripyran trisodium salt.

Example 17

2,8-Dicarboxy-4,6-dioxo-10-n-pentyl-4H,6H-benzo [1,2-b: 5,4-b'] dipyran a. 2,6-Diacetoxy-n-pentylbenzene A solution of 3.7 parts of 2-n-pentylresorcinol, 3.25 parts of acetyl chloride and 3.25 parts of pyridine in 50 parts of chloroform was heated under reflux for 18 hours. The solution was cooled and then poured into water.

The chloroform layer was separated and washed with dilute hydrochloric acid, water, sodium hydroxide solution and water, then dried over sodium sulphate. The chloroform was then evaporated to leave an oil which was distilled to give 2,6-diacetoxy-n-pentylbenzene, boiling point t142°–4° C. at a pressure of 1.75 mms of mercury.

Analysis
Found: C, 68.1 H, 7.71%
$C_{15}H_{20}O_4$ requires: C, 68.16 H, 7.63% b. 4,6-Diacetyl-2-n-pentylresorcinol

By the method of Example 15 (a) 4,4 parts of 2,6-diacetyl-n-pentylbenzene were converted into 4,6-diacetyl-2-n-pentylresorcinol. This compound was not completely purified but was used directly for the next stage of the reaction.

c. 2,8-Dicarboxy-4,6-dioxo-10-n-pentyl-4H,6H-benzo [1,2-b: 5,4-b'] dipyran

By the method of Example 16 (a) 1.34 parts of crude 4,6-diacetyl-2-n-pentylresorcinol were converted into 2,8-dicarboxy-4,6-dioxo-10-n-pentyl-4H,6H-benzo [1,2-b: 5,4-b'] dipyran, melting point 268° C. (d).

Analysis
Found: C, 61.1 H, 4.76%
$C_{19}H_{16}O_8$ requires: C, 61.29 H, 4.33% d. 2,8-Dicarboxy-4,6-dioxo-10-n-pentyl-4H,6H-benzo [1,2-b: 5,4-b'] dipyran disodium salt By the method of Example 15 (d) 0.046 parts of 2,8-dicarboxy-4,6-dioxo-10-n-pentyl-4H,6H-benzo [1,2-b: 5,4-b'] dipyran were converted into 2,8-dicarboxy-4,6-dioxo-10-n-pentyl-4H,6H-benzo [1,2-b: 5,4-b'] dipyran disodium salt.

Example 18

2,8-Dicarboxy-5-methoxy-4,6-dioxo-10-propyl-4H,6H-benzo [1,2-b: 5,4-b'] dipyran a. 2,6-Diacetyl-3-allyloxy-5-benzyloxyphenol A mixture of 13.5 parts of 2,4-diacetyl-5-allyloxyresorcinol, 7.5 parts of anhydrous potassium carbonate, 13 parts of benzyl chloride, 0.5 parts of potassium iodide, and 60 parts of dry acetone was stirred and refluxed for 43 hours. Most of the acetone was removed, and the residue was mixed with water and acidified to give an orange oil, which was extracted with ether. The ethereal By the method of Example 15 (b) 4.0 parts of 2,4-diacetyl-5-methoxy-6-propylresorcinol were converted to 2,8-diethoxycarbonyl-5-methoxy-4,10-dioxo-6-propyl-4H,10H-benzo [1,2-b: 3,4-b'] dipyran, melting point 154°–155°C.

Analysis

Found: C, 61.2 H, 5.08%
$C_{22}H_{22}O_9$ requires: C, 61.4 H, 5.15% d. 2,8-Dicarboxy-5-methoxy-4,10-dioxo-6-propyl-4H,10H-benzo [1,2-b: 3,4-b'] dipyran hemihydrate By the method of Example 15 (c) 0.5 parts of 2,8-diethoxycarbonyl-5-methoxy-4,10-dioxo-6-propyl-4H,10H-benzo [1,2-b: 3,4-b'] dipyran were converted into 2,8-dicarboxy-5-methoxy-4,10-dioxo-6-propyl-4H,10H-benzo [1,2-b: 3,4-b'] dipyran hemihydrate, melting point 268°–270°C.

Analysis

Found: C, 55.8 H, 3.47%
$C_{18}H_{14}O_9 \cdot \frac{1}{2}H_2O$ requires: C, 56.4 H, 3.9% e. 2,8-Dicarboxy-5-methoxy-4,10-dioxo-6-propyl-4H,10H-benzo [1,2-b: 3,4-b'] dipyran disodium salt By the method of Example 15 (d) 0.132 parts of 2,8-dicarboxy-5-methoxy-4,10-dioxo-6-propyl-4H,10H-benzo [1,2-b: 3,4-b'] dipyran hemihydrate were converted into 2,8-dicarboxy-5-methoxy-4,10-dioxo-6-propyl-4H,10H-benzo [1,2-b: 3,4-b'] dipyran disodium salt.

Example 20

2,8-Dicarboxy-10-ethyl-5-methyl-4,6-dioxo-4H,6H-benzo [1,2-b: 5,4-b'] dipyran a. 1,3-Bis-(1,2-trans-dicarboxyvinyloxy)-2-ethyl-5-methylbenzene A solution of 3 parts of 2-ethyl-5-methylresorcinol and 6.5 parts of dimethyl acetylnedicarboxylate in 10 parts of dioxan was treated with 3 drops of a 40% aqueous solution of benzyltrimethyl-ammonium hydroxide and subsequently heated on a steam-bath for 15 minutes. The mixture was then cooled and treated with 30 parts of a 25% sodium hydroxide solution in water and reheated on a steam-bath for 20 minutes. The mixture was cooled, washed with ether to remove dioxan, acidified with sulphuric acid and extracted with ether. Evaporation of the second ethereal solution left 1,3-bis-(1,2-trans-dicarboxyvinyloxy)-2-ethyl-5-methylbenzene, melting point 162.5°C.

Analysis

Found: C, 53.0 H, 4.33%
$C_{17}H_{16}O_{10}$ requires: C, 53.65 H, 4.21% b. 2,8-Dicarboxy-10-ethyl-5-methyl-4,6-dioxo-4H,6H-benzo [1,2-b: 5,4-b'] dipyran hemihydrate To a stirred solution of 25 parts of chlorosulphonic acid was added, in small lots, 3 parts of 1,3-bis-(1,2-trans-dicarboxyvinyloxy)-2-ethyl-5-methylbenzene. The solution was allowed to stand for 10 minutes then it was carefully diluted with 25 parts of concentrated sulphuric acid, then heated briefly at 50°C, cooled and finally poured on to 350 parts of ice. A precipitate was deposited which was filtered off and dried to leave a brown powder. The product was boiled with aqueous ethanol, filtered off and dried, then dissolved in sodium bicarbonate solution and reprecipitated with hydrochloric acid, then again filtered off and dried to leave 2,8-dicarboxy-10-ethyl-5-methyl-4,6-dioxo-4H,6H-benzo [1,2-b: 5,4-b'] dipyran hemihydrate, melting point 312°C. (d).

Analysis

Found: C, 57.6 H, 3.54%
$C_{17}H_{12}O_8 \cdot \frac{1}{2}H_2O$ requires: C, 57.7 H, 3.68% c. 2,8-Dicarboxy-10-ethyl-5-methyl-4,6-dioxo-4H,6H-benzo [1,2-b: 5,4-b'] dipyran disodium salt By the method of Example 15 (d) 0.38 parts of 2,8-dicarboxy-10-ethyl-5-methyl-4,6-dioxo-4H,6H-benzo [1,2-b: 5,4-b'] dipyran hemihydrate were converted into 2,8-dicarboxy-10-ethyl-5-methyl-4,6-dioxo-4H,6H-benzo [1,2-b: 5,4-b'] dipyran disodium salt.

Example 21

2,7-Dicarboxy-4,9-dioxo-4H,9H-benzo [1,2-b: 4,5-b'] dipyran a. 2,7-Diethoxycarbonyl-4,9-dioxo-4H,9H-benzo [1,2-b: 4,5-b'] dipyran By the method of Example 15 (b) 2.4 parts of 1,4-diacetyl-2,5-dihydroxybenzene were converted into 2,7-diethoxy-carbonyl-4,9-dioxo-4H,9H-benzo [1,2-b: 4,5-b'] dipyran, melting point 244°–245°C.

Analysis

Found: C, 60.2 H, 3.78%
$C_{18}H_{14}O_8$ requires: C, 60.34 H, 3.94% b. 2,7-Dicarboxy-4,9-dioxo-4H,9H-benzo [1,2-b: 4,5-b'] dipyran hemihydrate

By the method of Example 15 (c) 0.5 parts of 2,7-diethoxycarbonyl-4,9-dioxo-4H,9H-benzo [1,2-b: 4,5-b'] dipyran were converted into 2,7-dicarboxy-4,9-dioxo-4H,9H-benzo [1,2-b: 4,5-b'] dipyran hemihydrate, melting point >340°C.

Analysis

Found: C, 53.4 H, 2.36%
$C_{14}H_{16}O_8 \cdot \frac{1}{2}H_2O$ requires: C, 53.0 H, 2.25% c. 2,7-Dicarboxy-4,9-dioxo-4H,9H-benzo [1,2-b: 4,5-b'] dipyran disodium salt

By the method of Example 15 (d) 0.154 parts of 2,7-dicarboxy-4,9-dioxo-4H,9H-benzo [1,2-b: 4,5-b'] dipyran hemihydrate were converted into 2,7-dicarboxy-4,9-dioxo-4H,9H-benzo [1,2-b: 4,5-b'] dipyran disodium salt.

EXAMPLE 22

The compounds described in Table II were tested to assess their acute toxicity and their effectiveness in inhibiting antibody-antigen reactions.

In most cases the compounds of the invention were found to possess very low toxicity values, that is they had $LD_{50}$ values of at least 1,000 mg/Kg of the compound (expressed in terms of the free acid).

In the antibody-antigen tests, the effectiveness of the compounds of the invention in inhibiting the passive cutaneous anaphylaxis in rats was assessed. It has been proved that this form of test gives reliable qualitative indications of the ability of the compounds under test to inhibit antibody-antigen reactions in man.

In this test method Sprague-Dawley rats (male or female) having a body weight of from 100 to 150 gms. were infected subcutaneously at weekly intervals with N. muris larvae in doses increasing from about 200 larvae per animal to 2000 larvae per animal in order to establish the infection in rats. After 8 weeks the rats were bled by heart puncture and 15–20 mls. of blood collected from each animal. The blood samples were then centrifuged at 3,500 rpm. for 30 minutes in order to remove the blood cells from the blood plasma. The blood was collected and used to provide a serum containing N. muris antibody. A pilot sensitivity test was carried out to determine the least quantity of serum required to give a skin weal in control animals in the test described below of >2 cm diameter. It was found that optimum sensitivity of rats in the body weight range 100–130 gms was obtained using a serum diluted with eight parts of water. This diluted solution is called antibody serum A.

The antigen to react with the antibody in serum A was prepared by removing N. muris worms from the gut of the infested rats, centrifuging the homogenate and collecting the supernatant liquor. This liquor was diluted with water to give a protein content of 1 g./ml. and is known as serum B.

Sprague-Dawley rats in the body weight range 100 to 130 gms. were sensitized by intra dermal injection of 0.1 mls. of serum A into the right flank. Sensitivity was allowed to develop for 24 hours and the rats were then injected intraveneously with 1 ml./100 gms. body weight of a mixture of serum B (0.25 mls.), Evans Blue dye solution (0.25 mls.) and the solution of the compound under test (0.5 mls. varying percentages of active matter). Insoluble compounds were administered as a separate intraperitoneal injection 5 minutes before intravenous administration of serum B and Evans Blue dye. For each percentage level of active matter in the solution under test five rats were injected. Five rats were used as controls in each test. The dosages of the compound under test were selected so as to give a range of inhibition values.

Thirty minutes after injection of serum B the rats were killed and the skins removed and reversed. The intensity of the anaphylactic reaction was assessed by comparing the size of the characteristic blue weal produced by spread of the Evans Blue dye from the sensitization site, with the size of the weal in the control animals. The size of the weal was rated as 0 (no weal detected, i.e. 100% inhibition) to 4 (no difference in size of weal, i.e., no inhibition) and the percentage inhibition for each dose level calculated as:

% inhibition = ((Control group score − treated group score) × 100)/(Control group score)

The percentage inhibitions for the various dose levels were plotted graphically for each compound. From these graphs the dosage required to achieve a 50% inhibition of the anaphylactic reaction ($ID_{50}$) may be determined. These results are tabulated in Table II.

TABLE II

| Name of Compound | $LD_{50}$ | $ID_{50}$ values in mg/Kg of the salt |
|---|---|---|
| 4,10-dioxo-2,8-dicarboxy-5-methoxy-4H,10H-benzo (1,2-b:3,4-b') dipyran disodium salt | > 1,000 | 0.73 |
| 4,6-dioxo-2,8-dicarboxy-4H,6H-benzo (1,2-b: 5,4-b') dipyran disodium salt | > 1,000 | 0.18 |
| 4,10-dioxo-2,8-dicarboxy-4H,10H-benzo (1,2-b:3,4-b') dipyran disodium salt | > 1,000 | 7.6 |
| 4,10-dioxo-2,8-dicarboxy-5-benzyloxy-4H,10H-benzo (1,2-b:3,4-b') dipyran disodium salt | 500 | 0.36 |
| 4,10-dioxo-2,8-dicarboxy-5-methyl-4H,10H-benzo (1,2-b:3,4-b') dipyran disodium salt | circa 1,000 | 9.5 |
| 4,6-dioxo-2,8-dicarboxy-5-methoxy-4H,6H-benzo (1,2-b:5,4-b') dipyran disodium salt |  | 0.32 |
| 4,10-dioxo-2,8-dicarboxy-6-ethyl-4H,10H-benzo (1,2-b:3,4-b') dipyran disodium salt | > 200 | 10 |
| 4,6-dioxo-2,8-dicarboxy-10-methyl-4H,6H-benzo (1,2-b:5,4-b') dipyran disodium salt | 1,000 | 0.25 |
| 4,10-dioxo-2,8-dicarboxy-5-hydroxy-4H,10H-benzo (1,2-b:3,4-b') dipyran disodium salt |  | 5 |
| 4,6-dioxo-2,8-dicarboxy-10-ethyl-4H,6H-benzo (1,2-b:5,4-b') dipyran disodium salt | > 250 | 0.1 |
| 4,6-dioxo-2,8-dicarboxy-10-nitro-4H,6H-benzo (1,2-b:5,4-b') dipyran disodium salt |  | 1.6 |
| 6,10-dicarboxy-4-methyl-2,8,12-trioxo-2H,8H,12H,-benzo (1,2-b:3,4-b':5,6-b'') tripyran disodium salt | > 500 | 4.25 |

EXAMPLE 23

To confirm the results obtained by the animal tests set out in Example 22, one compound [4,10-dioxo-2,8-dicarboxy 5-methoxy-4H,10H,-benzo (1,2-b:3,4-b') dipyran disodium salt] was selected at random and its effectiveness in relieving allergic asthma in man determined. In this test, the ability of the compound to reduce airway constriction or obstruction following the administration of an antigen was assessed by means of a spirometer.

In carrying out the tests a human subject was given one dose of antigen at each visit, since a partial, variable, temporary desensitization occurs after each dose of antigen. The dose of antigen was administered by aerosol at a rate of 8 liters of air per minute using a Wright nebulizer for 120 seconds. The visits occurred at intervals of at least three days and, where possible, were made at constant intervals. The concentration of the antigen given to each subject was adjusted so that the maximum reduction in the forced exhalation volume in one second (F.E.V.) observed within 30 minutes of antigen administration was about 40%. Having determined the approximate dose of antigen required to achieve a satisfactory reduction in F.E.V., the subject was then tested for the effect of the compound under test. This was done by administering the determined amount of antigen 1 hour after a measured amount of the compound under test.

Administration of the compound was achieved by inhalation of an aerosol of a 5% solution of the sodium salt of the compound under test using a Wright nebulizer. Inhalation was carried out over a period of 20 minutes sat a rate of 0.2 ml. of solution per minute.

The F.E.V. of the subject was then measured at intervals after the antigen had been administered and the degree of protection afforded calculated from the following formula:

100 × (Max F.E.V. fall in control visits − Max. F.E.V. in test visits)/(Max. F.E.V. in control visits)

The average protection of the compound tested is given below:

| Interval after antigen administration | 2 hours | 4 hours | 6 hours | 8 hours |
|---|---|---|---|---|
| Percentage Inhibition | 49.5 | 46 | 30.5 | 20.5 |

We claim:
1. A compound of formula,

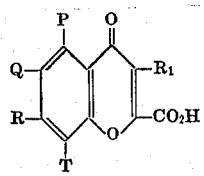

I in which one or more adjacent pairs of P, Q, R and T, together form the chain $-CO-CR_1=C(COOH)-O-$ which may be bonded to the benzene ring in either sense; the remainder of P, Q, R and T are the same or different and each is hydrogen; alkyl containing from one to 10 carbon atoms, alkyl containing from one to 10 carbon atoms and carrying a
  halo; hydroxy; lower alkoxy; acetoxy; carboxy; amino; lower alkylamino; lower dialkylamino; or a hydroxylamino substituent group;
  unsaturated alkyl containing from one to 10 carbon atoms; phenylalkyl, halophenylalkyl or alkylphenylalkyl wherein the alkyl groups contain from one to 10 carbon atoms; phenyl; naphthyl; or phenyl and naphthyl carrying a
  halo; lower alkyl; nitro, carboxy or hydroxy substituent group;
  pyridyl; furyl; pyrrolyl; cycloalkyl containing from four to six carbon atoms; cycloalkyl containing from four to six carbon atoms and carrying a
  hydroxyl, lower alkoxyl or carboxy substituent group;
  nitrile; nitro; nitroso; hydroxy; alkoxy containing one to 10 carbon atoms; alkoxy containing from one to 10 carbon atoms and carrying a
  hydroxy, lower alkoxy, carboxy halo, amino, lower alkylamino, or lower dialkylamino substituent group;
  alkenyloxy or alkynyloxy containing from one to 10 carbon atoms; benzyloxy; phenyloxy; naphthyloxy; pyridyloxy; cyclohexyloxy; cyclopentyloxy; epoxyloweralkoxy; amino; lower alkylamino; lower dialkylamino; cycloalkylamino containing from four to six carbon atoms; phenylamino; naphthylamino; diphenylamino; haloloweralkylamino; lower alkenylamino; aminoloweralkylamino; hydroxylamino; loweralkanoylamino; ureyl; thioureyl; guanidino; thiol; lower alkyl thiol; phenyl thiol; sulphonic acid; halogen or
  one or more of P, Q, R and T may be a group OY wherein Y is an alkyl group having from one to 10 carbon atoms substituted by lower alkyl or phenyl-lower alkyl in which one or more of the $CH_2$ groups has been replaced by oxygen, sulphur or carbonyl, which alkyl or phenyl lower alkyl may carry one or more hydroxyl or carboxyl substituent groups; or an adjacent pair of R, Q, R and T (together with the adjacent carbon atoms in the benzene ring) together form a benzene ring, or a chain $-(CH_2)_4-$, $-(CH_2)_3-$, $-COCH=C(COOH)-O-$, $-O(CH_2)_3-$, $-O(CH_2)_2-$, $-C(CH_3)=CH-CO-O-$, $-O(CH_2)_2O-$, $-CH_2-CH(CH_3)-O-$, $-CH=CH-O-$, $-CH=C(CH_3)-O-$, $-OCH_2O-$, $-NH-C(R^4R^5)-CH_2-O-$, $-NR^5-CH=CH-O-$ or $-NR^4-CH=CH-NR^4-$ (wherein $R^4$ is hydrogen or lower alkyl or lower alkoxy and $R^5$ is hydrogen, or $R^4$ and $R^5$ together form a $=O$ group),
  and each $R_1$ may be the same or different and is hydrogen, alkyl containing from one to 10 carbon atoms, alkoxy containing from one to 10 carbon atoms or phenyl
  and pharmaceutically acceptable salts thereof.

2. A compound according to claim 1, wherein those of P, Q, R and T not forming a $-CO-CR_1=C(COOH)-O-$ chain are hydrogen or halogen, hydroxy, nitro, lower alkyl, lower alkenyl, benzyl, phenyl, lower alkoxy, lower alkenyloxy, phenyl, benzyloxy or the fused ring substituents specified in claim 1 or such groups carrying a halogen, hydroxy or lower alkoxy substituent.

3. A compound according to claim 1, wherein those of P, Q, R and T not forming a $-CO-CR_1=C(COOH)-O-$ chain are hydrogen, chlorine, bromine, nitro or lower alkyl or alkoxy group containing from one to six carbon atoms which may carry a hydroxy, lower alkoxy or phenyl substituent.

4. A compound according to chain 1 and of formula,

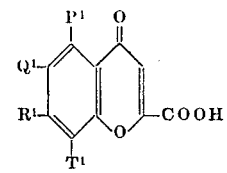

wherein an adjacent pair of $P^1$, $Q^1$, $R^1$ and $T^1$ together forms the chain $-CO-CH=C(COOH)-O-$ which may be bonded to the benzene ring in either sense; and the other two $P^1$, $Q^1$, $R^1$ and $T^1$ may be the same or different and each is hydrogen, halogen, nitro, lower alkyl, lower alkoxy, or a lower alkyl or alkoxy group carrying a hydroxy, lower alkoxy or phenyl substituent.

5. A compound according to claim 1 in which those of P, Q, R and T which do not form a chain —COCR$_1$=C(COOH)—O— are selected from the group consisting of hydrogen, hydroxy, nitro, halogen, lower alkyl, lower alkoxy or lower alkenyloxy groups (which groups may carry a hydroxy or lower alkoxy substituent), a benzyl group or an adjacent pair of P, Q, R and T may, form a chain —O—(CH$_2$)$_2$, and
   each R$_1$ is selected from the group consisting of hydrogen, alkyl containing from one to 10 carbon atoms, alkoxy containing from 1 to 10 carbon atoms and phenyl.

6. A compound according to claim 1 in which R$_1$ is hydrogen and those of P,Q,R and T which do not form a —COCR$_1$=(COOH)—O—chain are selected from methoxy, hydroxy, nitro, methyl, bromo, benzyloxy, ethyl, chloro, allyloxy, butyl, propyl and pentyl.

7. A compound according to claim 1, vis., 4, 10-Dioxo-5-methoxy-2,8-dicarboxy-4H,10H-benzo (1,2-b:-3,4-b') dipyran and the sodium salt thereof.

8. A compound according to claim 1, vis., 4,10-Dioxo-2,8-dicarboxy-5-hydroxy-4H 10H-benzo (1,2-b:3,4-b') dipyran and the sodium salt thereof.

9. A compound according to claim 1, vis., 4,10-Dioxo-5-methyl-2,8-dicarboxy-4H,10H-benzo (1,2-b:3,4-b') dipyran and the sodium salt thereof.

10. A compound according to claim 1, vis., 2,8-Diethoxycarbonyl-4, 10-dioxo-4H, 10H-benzo (1,2b:3,4-b') dipyran and the sodium salt thereof.

11. A compound according to claim 1, vis., 2,8-Dicarboxy-4,6-dioxo-10-nitro-4H,6H-benzo (1,2-b:5,4-b') dipyran and the sodium salt thereof.

12. A compound according to claim 1, vis., 2,8-Dicarboxy-4,6-dioxo-10 methyl -4H, 6H-benzo (1,2-b: 5,4-b') dipyran and the sodium salt thereof.

13. A compound according to claim 1, vis., 6-Bromo-2,8-dicarboxy-4,10-dioxo-5-hydroxy-4H,10H-benzo (1,2-b:3,4-b') dipyran and the sodium salt thereof.

14. A compound according to claim 1, vis., 4,6-dioxo-2,8-dicarboxy-4H,6H-benzo (1,2-b:5,4-b') dipyran and the sodium salt thereof.

15. A compound according to claim 1, vis., 5-Benzyloxy-4,10-dioxo-2,8-dicarboxy-4H,10H-benzo (1,2-b:3,4-b') dipyran and the sodium salt thereof.

16. A compound according to claim 1, vis., 5-Methoxy-4,6-dioxo-2,8-dicarboxy-4H,6H-benzo (1,2b:-5,4b') dipyran and the sodium salt thereof.

17. A compound according to claim 1, vis., 4,10-Dioxo-6-ethyl-2,8-dicarboxy-4H,10H-benzo (1,2-b: 3,4-b') dipyran and the sodium salt thereof.

18. A compound according to claim 1, vis., 4,6-Dioxo-2,8-dicarboxy-10-ethyl-4H, 6H-benzo (1,2-b:5,4-b') dipyran and the sodium salt thereof.

19. A compound according to claim 1, vis., 6,10-dicarboxy-4-methyl-2,8,12-trioxo-2H,8H,12H-benzo (1,2-b: 3,4-b': 5,6-b'')tripyran and the sodium salt thereof.

20. A compound according to claim 1, vis., 4,10-dioxo-2,8-dicarboxy-5-allyloxy-4H,10H-benzo (1,2-b:3,4-b') dipyran 21. A compound according to claim 1, vis., 10-Butyl-2,8-dicarboxy-4,6-dioxo-4H,6H-benzo [1,2-b: 5,4-b'] dipyran 22. A compound according to claim 1, vis., 2,6,10,10-Tricarboxy-4,8,12-trioxo-4H,8H12H-benzo [1,2-b: 3,4-b': 5,6-b''] tripyran and the sodium salt thereof.

23. A compound according to claim 1, vis., 2,8-Dicarboxy-4,6-dioxo-10-n-pentyl-4H,6H-benzo [1,2-b: 5,4-b'] dipyran 24. A compound according to claim 1, vis., 2,8-Dicarboxy-5-methoxy-4,6-dioxo-10-propyl-4H,6H-benzo [1,2-b: 5,4-b'] dipyran 25. A compound according to claim 1, vis., 2,8-Dicarboxy-5-methoxy-4,10-dioxo-6-propyl-4H,10H-benzo [1,2-b: 3,4-b'] dipyran 26. A compound according to claim 1, vis., 2,8-Dicarboxy-10-ethyl-5-methyl-4,6-dioxo-4H,6H-benzo [1,2-b: 5,4-b'] dipyran 27. A compound according to claim 1, vis., 2,7-Dicarboxy-4,9-dioxo-4H,9H-benzo [1,2-b: 4,5-b'] dipyran and the sodium salt thereof.

28. A compound according to claim 1, vis., 4,10-dioxo-6-chloro-2,8-dicarboxy-4H,10H-benzo (1,2-b:3,4-b') dipyran

* * * * *